US010506464B2

(12) United States Patent
Chen et al.

(10) Patent No.: US 10,506,464 B2
(45) Date of Patent: Dec. 10, 2019

(54) IDENTIFICATION OF A BEAMFORMED REGION

(71) Applicant: NEC Corporation, Tokyo (JP)

(72) Inventors: Yuhua Chen, London (GB); Sivapathalingham Sivavakeesar, Milton Keynes (GB)

(73) Assignee: NEC CORPORATION, Minato-ku, Tokyo (JP)

(*) Notice: Subject to any disclaimer, the term of this patent is extended or adjusted under 35 U.S.C. 154(b) by 0 days.

(21) Appl. No.: 15/524,105

(22) PCT Filed: Oct. 19, 2015

(86) PCT No.: PCT/JP2015/005252
§ 371 (c)(1),
(2) Date: May 3, 2017

(87) PCT Pub. No.: WO2016/072052
PCT Pub. Date: May 12, 2016

(65) Prior Publication Data
US 2017/0318491 A1 Nov. 2, 2017

(30) Foreign Application Priority Data
Nov. 7, 2014 (GB) .................................. 1419884.0

(51) Int. Cl.
H04W 24/10 (2009.01)
H04W 16/28 (2009.01)
(Continued)

(52) U.S. Cl.
CPC .......... H04W 24/10 (2013.01); H04B 7/0617 (2013.01); H04B 7/0639 (2013.01);
(Continued)

(58) Field of Classification Search
CPC ..... H04W 24/10; H04W 16/28; H04W 16/14; H04W 84/042; H04W 88/08;
(Continued)

(56) References Cited

U.S. PATENT DOCUMENTS

2012/0040706 A1 2/2012 Shin et al.
2012/0083280 A1 4/2012 Liu et al.
(Continued)

FOREIGN PATENT DOCUMENTS

CN 1385009 A 12/2002
CN 102027693 A 4/2011
(Continued)

OTHER PUBLICATIONS

3GPP TS 36.213 V.10.12.0 (Mar. 2014), Technical Specification, 3rd Generation Partnership Project; Techincal Specification Group Radio Access Network; Evolved Universal Terrestrial Radio Access (E-UTRA); Physical layer procedures (Release 10).
(Continued)

Primary Examiner — Omar J Ghowrwal
(74) Attorney, Agent, or Firm — Sughrue Mion, PLLC

(57) ABSTRACT

A communication system is disclosed in which a serving base station configures a mobile device for performing measurements with respect to signals transmitted by a neighbor base station. The serving base station obtains a measurement report from the mobile device, the measurement report comprising a result of signal measurements in association with information identifying a beamformed region in which a signal to which said result of said signal measurements relates was transmitted.

15 Claims, 11 Drawing Sheets

(51) Int. Cl.
| | | |
|---|---|---|
| *H04B 7/06* | (2006.01) | |
| *H04W 16/14* | (2009.01) | |
| *H04L 1/00* | (2006.01) | |
| *H04L 5/00* | (2006.01) | |
| *H04W 84/04* | (2009.01) | |
| *H04W 88/08* | (2009.01) | |
| *H04W 88/02* | (2009.01) | |

(52) U.S. Cl.
CPC .......... *H04L 1/0026* (2013.01); *H04L 5/0073* (2013.01); *H04W 16/14* (2013.01); *H04W 16/28* (2013.01); *H04W 84/042* (2013.01); *H04W 88/02* (2013.01); *H04W 88/08* (2013.01)

(58) Field of Classification Search
CPC ... H04W 88/02; H04B 7/0639; H04B 7/0617; H04L 1/0026; H04L 5/0073
See application file for complete search history.

(56) References Cited

U.S. PATENT DOCUMENTS

| | | | |
|---|---|---|---|
| 2012/0190378 A1 | 7/2012 | Han et al. | |
| 2013/0033998 A1 | 2/2013 | Seo et al. | |
| 2014/0105118 A1* | 4/2014 | Senarath | H04W 72/1231 370/329 |
| 2015/0063488 A1* | 3/2015 | Dinan | H04B 7/0456 375/267 |
| 2016/0156435 A1* | 6/2016 | Maniatis | H04L 1/0015 370/336 |
| 2017/0201892 A1* | 7/2017 | Wen | H04L 5/006 |

FOREIGN PATENT DOCUMENTS

| | | |
|---|---|---|
| CN | 102113359 A | 6/2011 |
| CN | 102857281 A | 1/2013 |
| EP | 2 590 442 A1 | 5/2013 |
| JP | 2013524616 A | 6/2013 |
| JP | 2013539314 A | 10/2013 |
| WO | 2011/122833 A2 | 10/2011 |
| WO | 2012/046997 A1 | 4/2012 |
| WO | 2013145046 A1 | 10/2013 |

OTHER PUBLICATIONS

3GPP TS 36.423 V12.3.0 (Sep. 2014), Technical Specification, 3rd Generation Partnership Project; Technical Specification Group Radio Access Network; Evolved Universal Terrestrial Radio Access Network (E-UTRAN); X2 application protocol (X2AP) (Release 12).
3GPP TSG RAN WG1 #73 Meeting, R1-132304 "Enhanced Fast ABS Adaptation for Rel-12 Small Cell Scenario 1", Nokia Siemens Networks, Nokia, RAN# 79bis, May 2013, Fukuoka, Japan.
3GPP TSG-RAN WG3#79bis, R3-130719 "SON for AAS: Scenarios and Solutions", Ericsson, RAN# 79bis, Apr. 2013, Chicago, USA.
Written Opinion of the International Searching Authority of PCT/JP2015/005252 dated Jan. 18, 2016.
International Search Report of PCT/JP2015/005252 dated Jan. 18, 2016.
Huawei, HiSilicon, "Design and Performance Evaluation of Coordinated Beamforming," 3GPP TSG RAN WG1 Meeting #66 Zhuhai, China, Oct. 10-14, 2011; R1-113214; 6 pages total.
Communication dated Jun. 6, 2018, from Japanese Patent Office in counterpart application No. 2017-5239258.
Communication dated Sep. 17, 2019 from the China National Intellectual Property Administration in application No. 201580060475.2.

* cited by examiner

Constant cell coverage and conventional Strict ABS Blinding

Time Varying cell coverage and Non-Strict ABS Blinding

IDENTIFICATION OF A BEAMFORMED REGION

CROSS REFERENCE TO RELATED APPLICATIONS

This application is a National Stage of Application No. PCT/JP2015/005252 filed Oct. 19, 2015, claiming priority based on British Patent Application No. 1419884.0 filed Nov. 7, 2014, the contents of all of which are incorporated herein by reference in their entirety.

TECHNICAL FIELD

The present invention relates to mobile communication devices and networks, particularly but not exclusively those operating according to the 3rd Generation Partnership Project (3GPP) standards or equivalents or derivatives thereof. The invention has particular although not exclusive relevance to the Long Term Evolution (LTE) of the Evolved Universal Terrestrial Radio Access Network (E-UTRAN).

BACKGROUND ART

In radio communications networks, traditionally, a given geographical area is divided into cells. Each cell of a network (thus each mobile communication device within a cell) is served by a base station. The operation of the base stations is controlled by a base station controller, which might be implemented as part of the base stations or as a separate entity. The base stations are capable of dynamically adjusting their transmission power and/or direction to ensure optimum radio channel quality to the served mobile communication devices (such as mobile telephones and other user equipment).

In relatively small geographical areas, such as office buildings or similar, where additional network capacity or a specific set of services are needed, so-called 'pico' cells may be implemented within (or partially overlapping with) the regular (i.e. 'macro') cells of the radio network. Pico cells are also known as 'femto' cells or simply 'small' cells. In some cases, a pico cell covers a home or a single room only. Pico cells effectively form parts of a larger network infrastructure, while providing services within a smaller coverage area. Communication networks comprising a variety of base station types and cell sizes (e.g. both macro and pico cells) are often referred to as Heterogeneous Networks (HetNets).

In order to maximise usage of system resources in HetNets, transmissions by base stations serving such macro and pico cells need to be synchronised in order to avoid or reduce harmful interference between them and interference caused to mobile communication devices served by the base stations. Therefore, the power of transmission may be selected by the base stations so that a maximum number of mobile communication devices can be served in parallel and at an optimum data rate without compromising transmission quality. Transmission power can be controlled on a base station level or cell level, whilst specific power levels can also be assigned to each mobile communication device and/or communication units (such as frames, subframes, resource elements, resource blocks, symbols) used to exchange data between the base stations and mobile communication devices.

In order to assist their serving base station in adjusting its transmission power appropriately, the mobile telephone is configured to measure and report the quality of the signals transmitted in its serving cell (and/or in neighbouring cells) and also to measure and report back any interference experienced in the serving cell. In order for the mobile telephone to able to measure interference caused by other transmitters than the serving base station, the serving base station's transmissions need to be muted, temporarily, at least for the duration of the mobile telephone's measurements.

The so-called Almost Blank Subframe (ABS) concept has been introduced by 3GPP as part of its Enhanced Inter-Cell Interference Coordination (eICIC) solution. ABS subframes are transmitted in accordance with a predetermined ABS pattern. Effectively, ABS subframes are special subframes designed to alleviate inter-cell interference, such as interference caused by a macro base station to a pico base station (and vice versa). The main feature of this technique is that in subframes designated to be an ABS subframe, the macro base station does not transmit any signals other than reference signals (at a very low power level). Therefore, if ABS subframes are configured in a macro cell, then the mobile communication device served by the pico cell (falling within or overlapping with the coverage area of that macro cell) is able to send data during such ABS subframes and hence avoid interference from the macro cell (at least for the duration of the ABS subframes).

More recently, 3GPP has also introduced a technique referred to as the Further Enhanced Inter-Cell Interference Coordination (feICIC). Briefly, instead of transmitting only reference signals in the ABS subframes, feICIC allows limited data transmissions as well. Specifically, feICIC allows transmissions on the physical downlink shared channel (PDSCH), albeit at a reduced power level (which may still be adequate for e.g. mobile communication devices located relatively close to the base station). Thus feICIC may reduce waste of available cell capacity (compared to eICIC), since transmissions in the macro cell are still possible during feICIC compatible ABS subframes (although not for all mobile communication devices).

In more detail, feICIC in 3GPP Release 10 and 11 requires the macro cell base station to configure its (semi-static) ABS pattern, and to inform its neighbouring pico base station(s) (using the so-called X2 interface) about its ABS configuration. The ABS configuration includes information identifying the applicable ABS muting pattern in the macro cell. The ABS muting pattern is expressed using a 40-bit string (representing a 40 ms periodicity) for frequency-division duplexing (FDD) mode.

The small cell (pico base station) uses the ABS information from the macro base station at least:

- in its scheduling decisions (especially for those mobile communication devices that are located in the so-called cell range expansion (RE) area); and/or
- in configuring measurement restrictions for mobile communication devices served by the pico cell (for example, through appropriate Channel State Information (CSI) measurement restrictions).

Pico cells are typically provided using passive antennas, which cause the overlaid coverage area of the macro cell over the small cell to remain relatively constant from control and data channel perspectives. This in turn makes it necessary in HetNet co-channel (macro/pico) deployments to use a strict ABS blinding (muting) of transmissions in the cells of the macro base station in the time-domain (i.e. the respective ABS patterns must be shared and co-ordinated between the macro and the pico base station). In other words, it is necessary for the overlapping macro and small cells to respect the semi-statically configured ABS pattern and transmit only such signals that are allowed in the ABS subframes.

SUMMARY OF INVENTION

Technical Problem

However, since feICIC operates very slowly (this is partly because feICIC relies on Radio Resource Control (RRC) signalling for the configuration of measurement restrictions before they can be applied), and also because the mobility and traffic pattern of mobile communication devices can be stochastic, the semi-statically configured feICIC may result in wasting of radio communication resources (e.g. when the ABS subframes are respected even in the absence of any inter-cell interference). The inventors have realised that this can in some cases lead to a sub-optimal use of the available radio spectrum.

Accordingly, preferred embodiments of the present invention aim to provide methods and apparatus which overcome or at least partially alleviate the above issues.

Solution to Problem

In one aspect, the invention provides a mobile communication device for a cellular communication system comprising a first base station and a second base station wherein the second base station is operable to transmit signals in any of a plurality of beamformed regions, the mobile communication device comprising: means for receiving, from said first base station, control data for configuring signal measurements with respect to said signals transmitted by said second base station; means for performing said signal measurements; and means for transmitting, to said first base station, a measurement report comprising a result of said signal measurements in association with information identifying a beamformed region in which a signal to which said result of said signal measurements relates was transmitted.

In one aspect, the invention provides a serving base station for a cellular communication system comprising a mobile communication device, said serving base station, and a neighbour base station, wherein the neighbour base station is operable to transmit signals in any of a plurality of beamformed regions, the serving base station comprising: means for sending, to said mobile communication device, control data for configuring signal measurements with respect to said signals transmitted by said neighbour base station; and means for obtaining, from said mobile communication device, a measurement report comprising a result of said signal measurements in association with information identifying a beamformed region in which a signal to which said result of said signal measurements relates was transmitted.

In one aspect, the invention provides a base station for a cellular communication system comprising a mobile communication device and a plurality of base stations, wherein said base station is operable to transmit signals in any of a plurality of beamformed regions, the base station comprising: means for obtaining, from one of said plurality of base stations: information identifying at least one of said plurality of beamformed regions; and information identifying a respective signal strength associated with said at least one of said plurality of beamformed regions.

In one aspect, the invention provides a server apparatus for a cellular communication system comprising a mobile communication device, a base station serving said mobile communication device, and a neighbour base station, wherein the neighbour base station is operable to transmit signals in any of a plurality of beamformed regions, the server apparatus comprising: means for sending, to said mobile communication device via said serving base station, control data for configuring trace measurements with respect to said signals transmitted by said neighbour base station; and means for obtaining, from said mobile communication device, a measurement report comprising a result of said trace measurements in association with information identifying a beamformed region in which a signal to which said result of said trace measurements relates was transmitted.

In one aspect, the invention provides a mobile communication device for a cellular communication system comprising a first base station and a second base station wherein the second base station is operable to transmit signals in any of a plurality of beamformed regions, the mobile communication device comprising: a receiver for receiving, from said first base station, control data for configuring signal measurements with respect to said signals transmitted by said second base station; a processor for performing said signal measurements; and a transmitter for transmitting, to said first base station, a measurement report comprising a result of said signal measurements in association with information identifying a beamformed region in which a signal to which said result of said signal measurements relates was transmitted.

In one aspect, the invention provides a serving base station for a cellular communication system comprising a mobile communication device, said serving base station, and a neighbour base station, wherein the neighbour base station is operable to transmit signals in any of a plurality of beamformed regions, the serving base station comprising: a transmitter for sending, to said mobile communication device, control data for configuring signal measurements with respect to said signals transmitted by said neighbour base station; and a receiver for obtaining, from said mobile communication device, a measurement report comprising a result of said signal measurements in association with information identifying a beamformed region in which a signal to which said result of said signal measurements relates was transmitted.

In one aspect, the invention provides a base station for a cellular communication system comprising a mobile communication device and a plurality of base stations, wherein said base station is operable to transmit signals in any of a plurality of beamformed regions, the base station comprising: a transceiver for obtaining, from one of said plurality of base stations: information identifying at least one of said plurality of beamformed regions; and information identifying a respective signal strength associated with said at least one of said plurality of beamformed regions.

In one aspect, the invention provides a server apparatus for a cellular communication system comprising a mobile communication device, a base station serving said mobile communication device, and a neighbour base station, wherein the neighbour base station is operable to transmit signals in any of a plurality of beamformed regions, the server apparatus comprising: a transmitter for sending, to said mobile communication device via said serving base station, control data for configuring trace measurements with respect to said signals transmitted by said neighbour base station; and a receiver for obtaining, from said mobile communication device, a measurement report comprising a result of said trace measurements in association with information identifying a beamformed region in which a signal to which said result of said trace measurements relates was transmitted.

In one aspect, the invention provides a system comprising the above described mobile communication device; serving base station; neighbour base station; and server apparatus.

In one aspect, the invention provides a method performed by a mobile communication device in a cellular communication system comprising a first base station and a second base station wherein the second base station is operable to transmit signals in any of a plurality of beamformed regions, the method comprising: receiving, from said first base station, control data for configuring signal measurements with respect to said signals transmitted by said second base station; performing said signal measurements; and transmitting, to said first base station, a measurement report comprising a result of said signal measurements in association with information identifying a beamformed region in which a signal to which said result of said signal measurements relates was transmitted.

In one aspect, the invention provides a method performed by a serving base station in a cellular communication system comprising a mobile communication device, said serving base station, and a neighbour base station, wherein the neighbour base station is operable to transmit signals in any of a plurality of beamformed regions, the method comprising: sending, to said mobile communication device, control data for configuring signal measurements with respect to said signals transmitted by said neighbour base station; and obtaining, from said mobile communication device, a measurement report comprising a result of said signal measurements in association with information identifying a beamformed region in which a signal to which said result of said signal measurements relates was transmitted.

In one aspect, the invention provides a method performed by a base station in a cellular communication system comprising a mobile communication device and a plurality of base stations, wherein said base station is operable to transmit signals in any of a plurality of beamformed regions, the method comprising: obtaining, from one of said plurality of base stations: information identifying at least one of said plurality of beamformed regions; and information identifying a respective signal strength associated with said at least one of said plurality of beamformed regions.

In one aspect, the invention provides a method performed by a server apparatus in a cellular communication system comprising a mobile communication device, a base station serving said mobile communication device, and a neighbour base station, wherein the neighbour base station is operable to transmit signals in any of a plurality of beamformed regions, the method comprising: sending, to said mobile communication device via said serving base station, control data for configuring trace measurements with respect to said signals transmitted by said neighbour base station; and obtaining, from said mobile communication device, a measurement report comprising a result of said trace measurements in association with information identifying a beamformed region in which a signal to which said result of said trace measurements relates was transmitted.

The invention provides, for all methods disclosed, corresponding computer programs or computer program products for execution on corresponding equipment, the equipment itself (equipment such as base station and mobile communication device, or components thereof) and methods of updating the equipment.

Exemplary embodiments of the invention will now be described, by way of example, with reference to the accompanying drawings in which:

DESCRIPTION OF EMBODIMENTS

<Overview>

Figure 1:
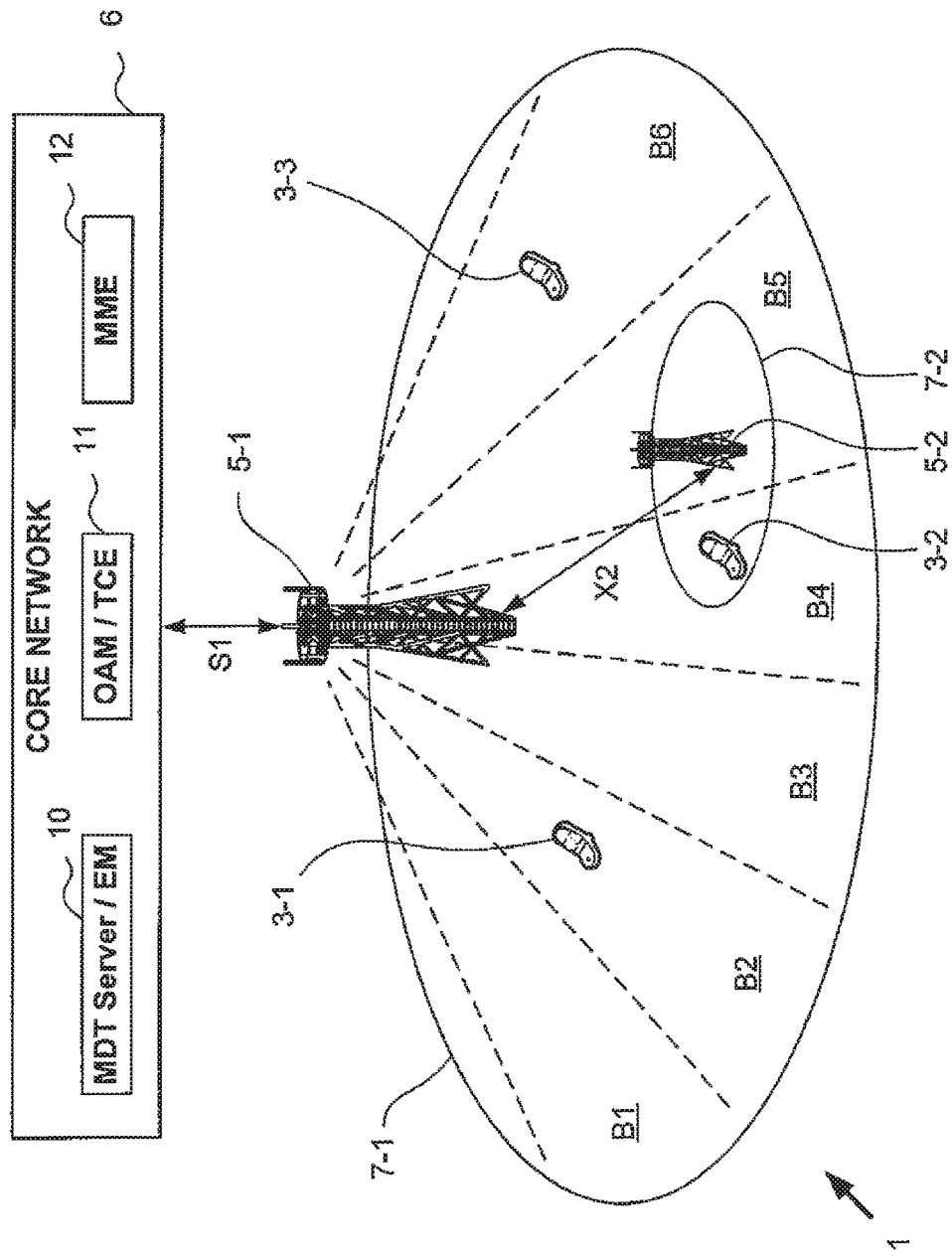
FIG. 1 schematically illustrates a telecommunication system.

FIG. 1 schematically illustrates a mobile (cellular) telecommunication system 1 in which a user of any of a plurality of mobile communication devices 3 (such as mobile telephones 3-1, 3-2, 3-3) can communicate with other users via one or more of a plurality of base stations 5. In the system illustrated in FIG. 1, each base station 5 shown is an Evolved Universal Terrestrial Radio Access Network (E-UTRAN) base station, which may also be referred to as an 'eNodeB' (or simply 'eNB') according to the commonly accepted 3GPP terminology.

The base stations 5 are connected to each other via a so-called X2 interface, and to a core network 6 via an S1 interface. In LTE, such a core network 6 is referred to as an Enhanced Packet Core (EPC) network. The base stations 5 may be connected to each other and to the core network either directly or via a suitable gateway, such as a serving gateway (S-GW), a small cell gateway, an X2 gateway, and/or the like.

In FIG. 1, the base station labelled 5-1 comprises a so called 'macro' base station operating a relatively geographically large 'macro' cell or cells, such as macro cell 7-1. The macro base stations 5-1 is connected to a so-called 'pico' base station 5-2 via an X2 interface (not shown), the pico base station 5-2 having a relatively small coverage area, a so-called 'pico' cell 7-2.

The power used by the pico base station 5-2 to provide the pico cell 7-2 is low relative to the power used by the macro base station 5-1 for the macro cell 7-1. The pico cell 7-2 is therefore small relative to the macro cell 7-1. Although in the example mobile telecommunication system of FIG. 1, the geographical coverage of the pico cell 7-2 falls completely within the geographical coverage of the macro cell 7-1, it will be appreciated that the geographical coverage of the pico cell 7-2 may overlap only partially with the geographical coverage of the macro cell 7-1.

The mobile communication device 3-2 located inside the coverage of the pico cell 7-2 (e.g. when being served by pico base station 5-2) might experience strong interference from the macro cell 7-1. However, mobile communication devices 3-1 and 3-3, which are located outside the pico cell 7-2 of the pico base station 5-2 do not suffer from such interference, because at their respective locations the received signal level from the macro base station 5-1 is stronger than the received signal level (if any) from the pico base station 5-2.

Each base station 5 is configured to send and receive signals in a sequence of radio frames (each typically 10 ms in duration). Each radio frame comprises a plurality of subframes (typically 1 ms in duration), each of which comprises a pair of slots (typically 0.5 ms in duration). Each slot is divided in time into a plurality of symbols (typically 6 or 7 depending on whether a normal or extended cyclic prefix is used) and in frequency into a plurality of sub-carriers thereby defining a multiplicity of individual resource elements each of which is characterized by an individual sub-carrier frequency and symbol. The time-frequency resources are typically allocated in blocks (termed 'resource blocks') each of which comprises the resource elements of 12 consecutive sub-carriers and the symbols of one slot.

The radio frames carry control and data signals between the base stations 5 and the mobile communication devices 3. The base station 5 dynamically allocates resource blocks to the mobile communication devices 3 in dependence of current transmission needs, device capabilities, system conditions and other static or dynamic parameters. The transmission power of the allocated resources can be controlled individually by the base stations 5. As the skilled person would appreciate, mobile communication devices 3 located closer to a base station 5 can be served using a lower transmission power than mobile communication devices 3 located at a greater distance. Therefore, resources for mobile communication devices 3 at a close proximity to the base stations 5 can be transmitted at a relatively lower power level than resource blocks for mobile communication devices 3 located nearer the boundary of the cells 7.

In this system, the macro base station 5-1 employs a beamforming technique and hence it serves mobile communication devices 3 located inside its cell 7-1 using a number of beams B1 to B6. In order to transmit beamformed signals, the macro base station 5-1 employs an Active Antenna Systems (AAS) comprising an appropriate antenna array configured for transmission/reception of energy in a specific direction. Apart from reducing interference in areas outside the beamformed signal coverage, beamforming also increases the cellular capacity and overall coverage provided by the macro base station 5-1. For sake of simplicity, it is assumed that the macro base station 5-1 employs 2D or 3D beams, and the pico base station 5-2 employs a normal passive antenna (i.e. it transmits non-beamformed signals), although it may also employ an AAS.

Some of the subframes transmitted by the macro base station 5-1, in each of the beams B1 to B6, are designated ABS subframes, which comprise resource elements that are either transmitted at substantially zero power (zero power ABS) or reduced power (non-zero power ABS). The sequence of ABS subframes in the series of transmitted subframes can be semi-statically configured by the base station, and this configuration is referred to as the ABS pattern. Further details of the almost blank subframes will be described below with reference to FIG. 2.

In the system shown on FIG. 1, the base stations 5 coordinate their transmission scheduling and their transmission powers so that inter-cell interference is avoided or reduced. The base stations 5 exchange info with each other on their applicable ABS pattern and ABS transmit power (e.g. used for their PDSCH transmissions in feICIC).

The ABS pattern can also be sent to the mobile communication devices 3 using higher layer signalling, such as RRC layer signalling. Thus, once the ABS pattern is configured for e.g. the mobile communication device 3-2 served by the pico base station 5-2, the mobile communication device 3-2 can carry out interference measurements on the subframes, including the ABS subframes.

Apart from interference, many other conditions affect the transmission between base stations 5 and mobile communication devices 3. Therefore, the mobile communication device 3-2 is configured to provide regular feedback to the serving base station 5-2 about the perceived signal quality. The feedback is based on signal measurements performed during the periods when the given mobile communication device 3 is not scheduled to communicate with the base station 5-2. Based on the result of measurements, the mobile communication device 3 generates and sends a report back to the serving base station 5-2. This feedback mechanism is called channel quality indication (CQI) and, it is employed to fine-tune the operation of the base stations 5, including resource allocation, scheduling and power of transmission.

The core network 6 includes, amongst others, a Minimization of Drive Tests (MDT) server 10, an operation and maintenance (OAM) entity 11, and a mobility management entity (MME) 12.

The components of the system 1 are configured such that information is shared between the base stations 5-1 and 5-2 regarding inter-cell interference. For example, a so-called "interfering-beam" table (and/or the like) may be generated at the pico base station 5-2, the MDT server 10, and/or the OAM entity 11. Such an interfering-beam table includes information identifying the beam(s) B1 to B6 causing interference (e.g. exceeding a predetermined threshold) to transmissions within the pico cell 7-2. The entity generating/managing this table (the base station 5-2, the MDT server 10, and/or the OAM entity 11) is configured to maintain the interfering-beam table based on the results of the measurements performed by user equipment served by the pico base station 5-2 (which in this case includes the mobile communication device 3-2). However, it will be appreciated that the interfering-beam table may also be updated based on the results of the measurements performed by other user equipment (e.g. mobile communication devices 3-1 and/or 3-3).

It will be appreciated that if the macro base station 5-1 uses multiple beams B1 to B6 for its transmissions then it is possible that only a sub-set of these beams B1 to B6 causes interference to the mobile communication devices 3 in the neighbouring (overlapping) small cell (pico cell) 7-2. As can be seen, in this example, beams B1 to B3, and B6 are directed away from the coverage area defined by the pico cell 7-2, and only beams B4 and B5 overlap with (at least part of) the pico cell 7-2.

Beneficially, in this system 1, a determination is made, based on the information held in the interfering-beam table, whether any of the beams B1 to B6 causes interference to transmissions in the pico cell 7-2 (e.g. whether or not the caused interference exceeds a predetermined threshold level). The macro base station 5-1 is configured to mute all data transmissions during eICIC ABS subframes using any of the beams B1 to B6 that has been determined to cause interference. However, the macro base station 5-1 is allowed to continue its data transmissions even during eICIC ABS subframes using any of the beams B1 to B6 that have been determined not to cause any interference (or to cause interference that is below a predetermined threshold level) to transmissions in the pico cell 7-2. Advantageously, this has the potential to increase the overall spectral efficiency that can be achieved in the cells 7-1 and 7-2 (compared to the efficiency that can be achieved using conventional eICIC/feICIC).

In order to assist the entity generating/managing the interfering-beam table (i.e. the base station 5-2/MDT server 10/OAM entity 11), the mobile communication device 3-2 is configured to derive and send, to the network, information identifying any macro cell beam B1 to B6 that causes interference to the mobile communication device 3-2 in the pico cell 7-2. Preferably, such 'interference information' relating to the beams B1 to B6 of the pico cell 7-1 may be provided to the network as part of: a procedure for measuring a received signal strength (such as a measurement procedure configured using RRC signalling); an MDT procedure; and/or an Automatic Neighbour Relation (ANR) procedure.

Advantageously, the mobile communication device 3-2 is able to calculate (based on information forming part of a macro base station 5-1 specific pre-coding codebook for controlling transmissions via the beams B1 to B6) the amount of interference caused by each of the beams B1 to B6 for the mobile communication device 3-2. In the example illustrated in FIG. 1, the mobile communication device's 3-2 calculations indicate interference from beam B4 only (because beams B1 to B3, and B6 do not overlap with the pico cell 7-2, and because beam B5 (which overlaps with the pico cell 7-2) is directed away from the mobile communication device's 3-2 current location). It will be appreciated that the mobile communication device 3-2 identifies a beam by its respective associated Precoding Matrix Indicator (PMI) (which forms part of the pre-coding codebook associated with the macro base station 5-1 and its beams B1 to B6).

Based on its calculations, the mobile communication device 3-2 is configured to report to the network interference information relating to the beams B1 to B6 of the macro cell 7-1 (e.g. instead of or in addition to reporting the total received power (RSRP) of the interfering macro cell 7-1).

In one exemplary embodiment, the mobile communication device 3-2 is configured to include, with its regular CQI feedback to the serving pico base station 5-2, interference information identifying which beams (e.g. beams B1, B2, B3, B5, and B6) do not cause interference to this the mobile communication device 3-2.

In another exemplary embodiment, the mobile communication device 3-2 is configured to include such interference information (identifying the beams B1 to B6 that do not cause interference to this mobile communication device 3-2) in a suitable MDT signalling message sent to the MDT server 10 (and/or to the OAM entity 11).

Upon receipt of the interference information from the mobile communication device 3-2, the pico base station 5-2 and/or the MDT server 10 (and/or the OAM entity 11) is configured to inform the macro base station 5-1 about any beams B1 to B6 interfering with transmissions in the pico cell 7-2. Using this information, the macro base station 5-1 is able to infer which beams B1 to B6 are safe to use during eICIC ABS subframes. Of course, in the absence of such information the macro base station 5-1 assumes that none of the beams B1 to B6 are useable during eICIC ABS subframes.

In summary, the following potential benefits may be achieved in the system illustrated in FIG. 1:
  it is possible for the macro base station to relax its requirement to mute signals transmitted in ABS subframes within its cell, thereby increasing the utilisation of the cell resources;
  by extending coordination between the base stations serving the macro and the pico cell, and/or between the macro base station and an MDT/OAM entity, it is possible to identify interfering beams; and
  by providing the macro base station information relating to interfering beams operated by that macro base station, the base station is able to mute only those beams (during ABS subframes) that are determined to cause interference to transmissions in the pico cell.

<Almost Blank Subframes>

Before describing detailed embodiments of how the present invention can be put into practice, a brief overview is given of the ABS subframe structure applicable in the system shown in FIG. 1.

Figure 2:
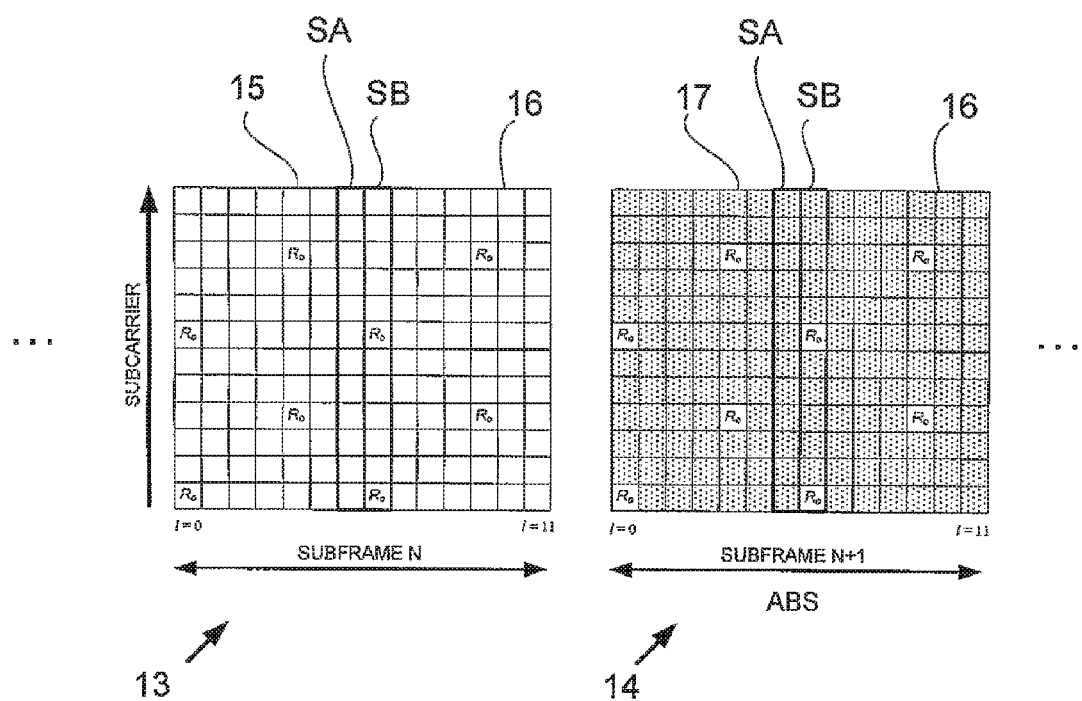
FIG. 2 shows an illustration of typical subframes used for communication in the telecommunication system of FIG. 1.

FIG. 2 illustrates, generally at 13, a typical resource grid of a subframe in a series of subframes 13, 14, etc., in which the resource elements include resource elements 15 used for physical downlink shared channel (PDSCH) signalling and resource elements 16 used for common (cell-specific) reference signalling (CRS). The skilled person would understand that some of the resources are allocated for other purposes, such as control signalling, and have been omitted here for the sake of simplicity. Each row represents a subcarrier frequency and each column, represents a symbol, and comprises a set of resource elements across the subcarrier frequencies of the given resource grid.

As seen in FIG. 2, in the example shown, CRSs are communicated in eight resources 16 distributed generally evenly throughout the resource grid using four distinct sub-carrier frequencies (rows) and four distinct symbol numbers (columns). Thus some symbols, for example symbol SA, comprise only PDSCH resources 15, while other symbols, such as symbol SB, comprise PDSCH resources 15 and CRS resources 16.

The CRS symbols 16 are transmitted at a predefined reference signal energy per resource element (RS EPRE) denoted by $R_0$. The PDSCH resources 15 are transmitted at a PDSCH EPRE value, which is configured by the base station 5 and might be different than the RS EPRE. Depending on this configuration and whether a symbol comprises PDSCH resources 15 only or both PDSCH resources 15 and CRS resources 16, the overall energy level per symbol can vary. As described in section 5.2 of 3GPP TS 36.213 v10.12.0, the mobile communication devices 3 are informed about the relationship between the cell specific RS EPRE and PDSCH EPRE by receiving the symbol dependent power ratios $\rho_A$ and $\rho_B$ from their respective base stations 5. Specifically, the symbol dependent power ratios $\rho_A$ and $\rho_B$ are derived from the higher layer signalled mobile communication device specific parameter $P_A$ and cell specific parameter $P_B$ (also referred to as P_A and P_B, respectively).

Thus, when the mobile communication devices 3 perform channel quality measurements over the various symbols SA, SB, they can also take into account of the respective symbol dependent power ratios ρA and ρB to provide an appropriate CQI to the base stations 5.

FIG. 2 also illustrates, generally at 14, a typical resource grid of an ABS, in which CRS resources 16 are transmitted at $R_0$, while PDSCH resources 17 are transmitted at a reduced EPRE. As described above, ABS 14 may be used to reduce or avoid inter-cell interference.

The ABS 14 comprises a series of symbols in columns, such as symbol SA with PDSCH resource elements 17 only and symbol SB with both PDSCH resource elements 17 and CRS resource elements 16. While the CRS resource elements 16 are transmitted at the same RS EPRE level as in case of the previous subframe 13, the reduced EPRE PDSCH resources 17 have a significantly lower energy level than the PDSCH resource elements 15 of the previous subframe 13.

<Mobile Communication Device>

Figure 3:
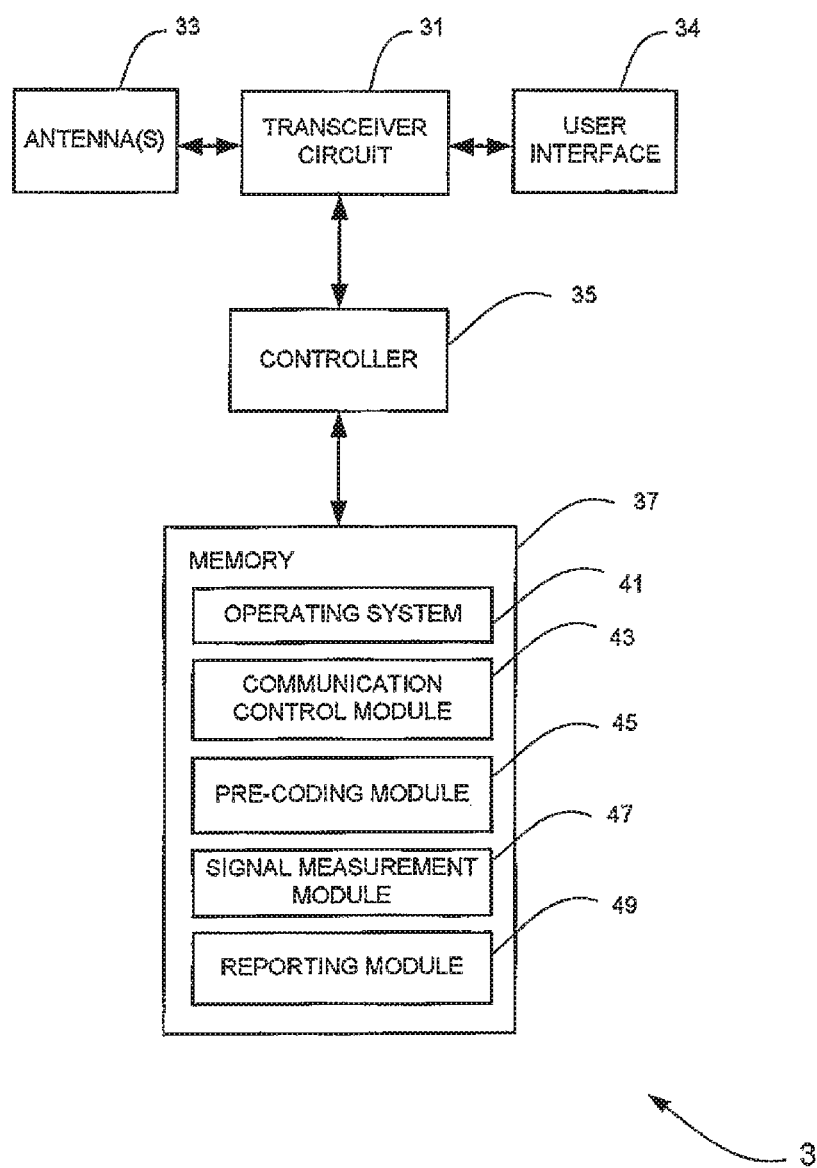
FIG. 3 shows a simplified block diagram of the main components of the mobile communication device shown in FIG. 1.

FIG. 3 is a block diagram illustrating the main components of the mobile communication device 3-2 shown in FIG. 1. The mobile communication device 3-2 comprises a transceiver circuit 31 which is operable to transmit signals to, and to receive signals from, its serving base station 5 via at least one antenna 33. Although not necessarily shown in FIG. 3, the mobile communication device 3-2 may of course have all the usual functionality of a conventional mobile telephone (such as a user interface 34) and this may be provided by any one or any combination of hardware, software and firmware, as appropriate.

The operation of the transceiver circuit 31 is controlled by a controller 35 in accordance with software stored in memory 37. The software may be pre-installed in the memory 39 and/or may be downloaded via the telecommunications network or from a removable data storage device (RMD), for example. The software includes, among other things, an operating system 41, a communication control module 43, a pre-coding module 45, a signal measurement module 47, and a reporting module 49.

The communication control module 43 manages communication with the base stations 5 serving the cell 7, in which the mobile communication device 3-2 is located. The communication control module 43 manages communications between the serving base station 5-2 and the mobile communication device 3-2 according to the schedule determined by the serving base station 5-2.

The pre-coding module 45 is responsible for processing signals received from the base stations 5, including reference signals and other signals that are subject to interference from transmissions by the macro base station 5-1. The pre-coding module 45 holds (e.g. in a pre-coding codebook and/or the like) information identifying a respective pre-coding matrix for each beam provided by the macro base station 5-1.

The signal measurement module 47 carries out measurements of the received transmit power over the symbols transmitted by the base stations 5. Using the information in the pre-coding codebook (held by the pre-coding module 45), the signal measurement module 47 calculates the received power for each beam (i.e. for each pre-coding matrix) using measurements of the reference signal received from the interfering macro cell. When carrying out these measurements, the signal measurement module 47 is operable to derive (e.g. based on the associated PMI included in the pre-coding matrix for the macro base station's 5-1 cell 7-1) which beam or beams (of the macro base station 5-1) cause and/or not cause interference to transmissions in the pico cell 7-2.

The reporting module 49 prepares the channel quality indication (CQI) reports to be sent to the base stations 5 and/or the MDT report to be sent to the MDT sever 10/OAM entity 11 in accordance with the measurements carried out by the signal measurement module 47. The reporting module 49 includes in its reports information identifying any beam that causes (and/or that does not cause) interference to transmissions in the pico cell 7-2.

<Base Station>

Figure 4:
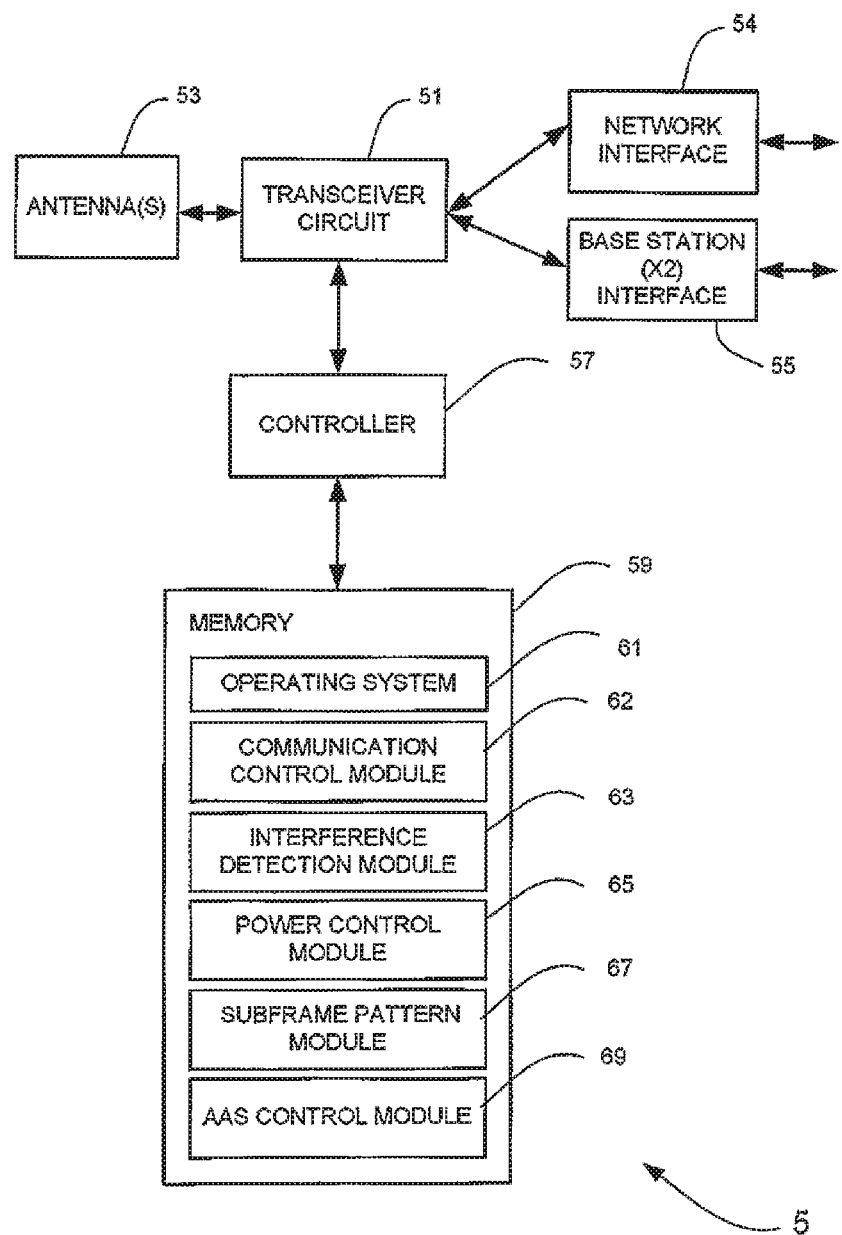
FIG. 4 shows a simplified block diagram of the main components of a base station shown in FIG. 1.

FIG. 4 is a block diagram illustrating the main components of the base stations 5 shown in FIG. 1. For clarity, the base station will be described with reference to the macro base station 5-1, but it will be appreciated that the pico base station 5-2 may be configured similarly. The base station 5 comprises a transceiver circuit 51 which is operable to transmit signals to, and to receive signals from, the mobile communication devices 3 via at least one antenna 53. The at least one antenna 53 may be configured as an antenna array forming part of an active antenna system (AAS) for controlled transmission/reception of signals in a specific direction.

The base station 5 is also operable to transmit signals to and to receive signals from: the core network 6 via a network interface 54; and other base stations in the vicinity of the base station via a base station (or so called 'X2') interface 55. The operation of the transceiver circuit 51 is controlled by a controller 57 in accordance with software stored in memory 59.

The software includes, among other things, an operating system 61, a communication control module 62, an interference detection module 63, a power control module 65, a subframe pattern module 67, and an AAS control module 69 (which is optional in case of the pico base station 5-2).

The communication control module 62 is operable to control communication with the mobile communication devices 3 within cell 7 and with the core network 6 and other base stations via the network interface 54. The interference detection module 63 is operable to detect inter-cell interference caused by (or caused to) neighbouring base stations 5, for example, by configuring appropriate signal quality measurements (and receiving corresponding measurement reports) for the mobile communication devices 3 in the cell(s) operated by the base station 5. The power control module 65 is operable to control the transmit power of the transmitted symbols and resources in the cell 7 of the base station 5. The subframe pattern module 67 manages the ABS pattern in the transmitted series of subframes 13, 14. The AAS control module 69 is responsible for controlling the antenna array to form a number of beams B1 to B6 for transmitting signals in specific directions towards the mobile communication devices 3 served by this base station 5.

<Trace Server (MDT Server/OAM Entity)>

Figure 5:
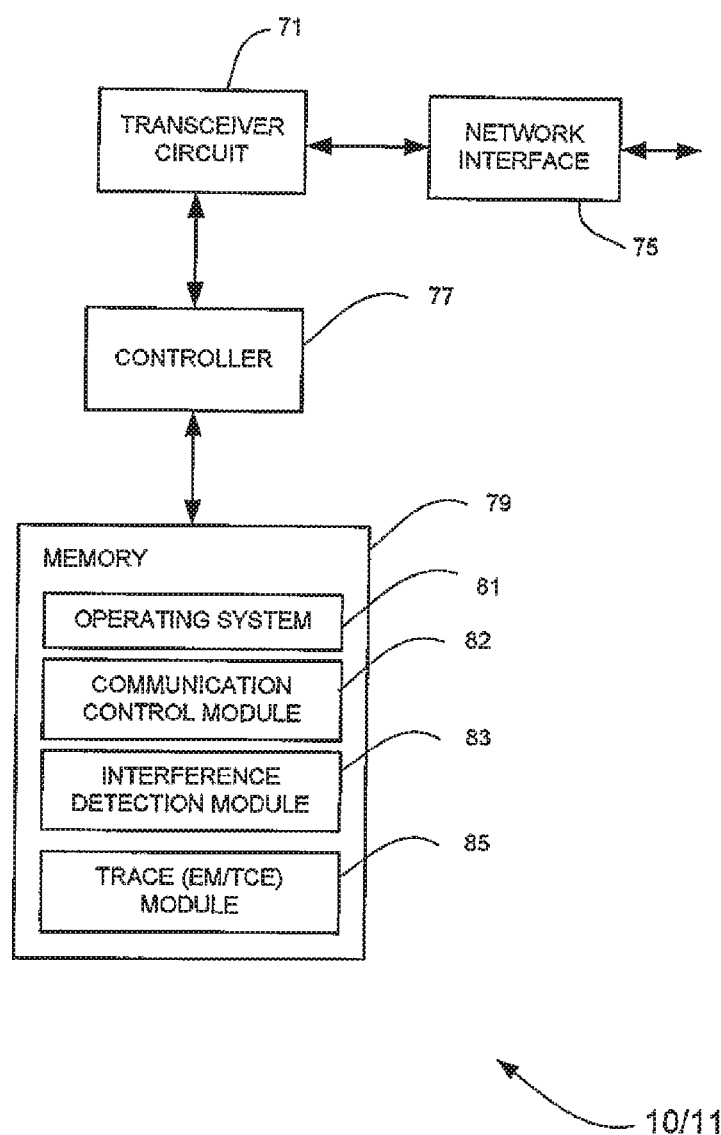
FIG. 5 shows a simplified block diagram of the main components of a server entity shown in FIG. 1.

FIG. 5 is a block diagram illustrating the main components of a trace server (such as the MDT server 10 and/or the OAM entity 11) shown in FIG. 1 responsible for maintaining the interfering-beam table. It will be appreciated that the functionalities of the trace server may be split between the MDT server 10 and the OAM entity 11, although the trace functionalities may also be implemented in a single server node.

The trace server comprises a transceiver circuit 71 which is operable to transmit signals to, and to receive signals from, the mobile communication devices 3 (via the serving base station 5), the base stations 5, and the core network 6, using a network interface 75. The operation of the transceiver circuit 71 is controlled by a controller 77 in accordance with software stored in memory 79.

The software includes, among other things, an operating system 81, a communication control module 82, an interference detection module 83, an interfering-beam table (not shown), and a trace module 85.

The communication control module 82 is operable to control communication with the other nodes, such as the mobile communication devices 3, the base stations 5, and other core network nodes via the network interface 75. The interference detection module 83 is operable to detect inter-cell interference caused by (or caused to) a particular base station 5 to its neighbouring base station(s). The interfering-beam table holds information (based on measurement reports submitted by the mobile communication device 3) on which beam(s) of which base station 5 cause interference (and/or that does not cause interference) to communications in neighbouring cells (such as interference between the overlapping macro cell 7-1 and pico cell 7-2).

The trace module 85 includes an element manager (EM) functionality and/or a trace collection entity (TCE) functionality for managing configuration of MDT procedures to be performed by the mobile communication device 3. In particular, the EM functionality configures the mobile communication device 3 for carrying out an MDT (trace) procedure relating to determining which beams cause interference and/or determining which beams do not cause interference in the pico cell 7-2. The TCE functionality receives appropriately formatted MDT (trace) reports from the mobile communication devices 3, the MDT reports including information identifying any beam that causes (and/or that does not cause) interference to transmissions in the pico cell 7-2, which information is used by the trace module 85 in updating the interfering-beam table. It will be appreciated that the EM and the TCE functionalities may be implemented by different network nodes (although they may also be implemented by the same network node).

In the above description, the mobile communication device, the base stations, and the server entity are described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

A more detailed description of some of the novel aspects of the operation of the base stations 5 and of the mobile communication device 3 will now be given, with reference to FIGS. 6 to 8.

Operation—First Embodiment

Figure 6:
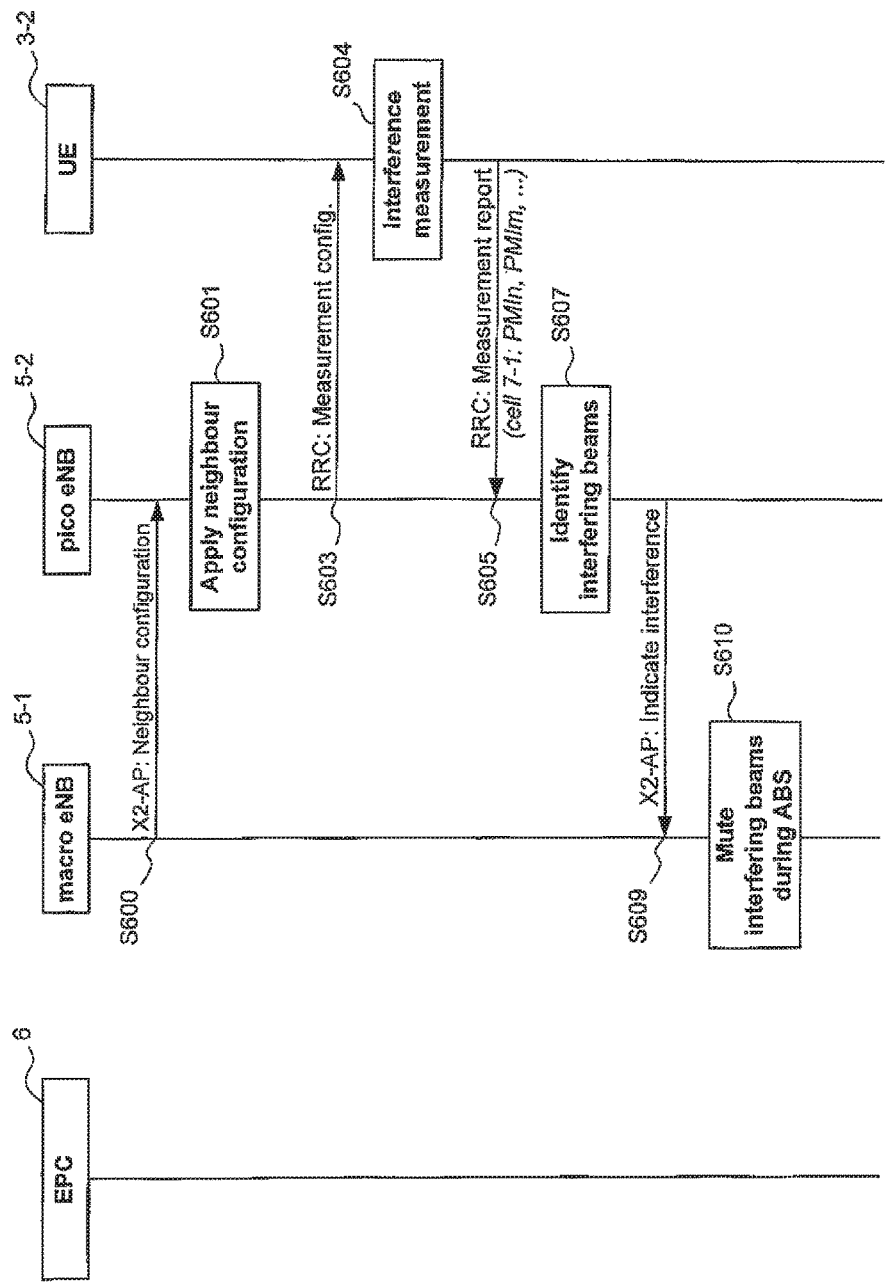
FIG. 6 is an exemplary timing diagram illustrating an exemplary procedure followed by nodes of the telecommunication system of FIG. 1 according to a first exemplary embodiment of the invention.

FIG. 6 is an exemplary timing diagram illustrating a procedure followed by nodes of the telecommunication system 1 of FIG. 1 according to a first exemplary embodiment of the invention. In this case, the mobile communication is configured for the measurement of beam specific interference (e.g. using an Automatic Neighbour Relation (ANR) procedure and/or the like).

Initially, as generally shown in step S600, the macro base station 5-1 generates and sends an appropriately formatted message (e.g. a 'neighbour configuration' X2 message) to the pico base station 5-2, the message including configuration information related to the operation of the macro base station 5-1. In this example, the configuration information includes, amongst others: information identifying antenna ports used by the macro base station 5-1, information identifying beams and associated parameters (such as orientation, PMI, etc), used by the macro base station 5-1, a PMI codebook used by the macro base station 5-1, information identifying whether or not Tx Mode (TM) is used by the macro base station 5-1, and/or the like.

In step S601, the pico base station 5-2 applies (e.g. stores in memory 59) the received 'macro-specific' configuration information.

Next, using the macro-specific configuration information, the pico base station 5-2 generates (using its interference detection module 63), and sends, in step S603, an appropriately formatted signalling message (such as an RRC 'measurement configuration' message including an appropriately formatted 'MeasConfig' information element) to configure the mobile communication device 3-2 for detecting beams that are interfering with communications for the mobile communication device 3-2 in the pico cell 7-2. In this example, the signalling message at step S603 includes control data for configuring one or more CQI measurement by the mobile communication device 3-2 with respect to transmissions using one or more of the beams B1 to B6 (and/or a respective PMI associated with each beam) operated by the macro base station 5-1.

In this case, the control data by the pico base station 5-2 requests the mobile communication device 3-2 to take measurements pertaining to beams B1 to B6 from the macro base station 5-1 in terms of one or more of: an orientation; PMI; azimuth angle; direction of arrival (DoA); angle of arrival (AoA); and location (e.g. the current position of the mobile communication device 3-2) of the received signal over beams B1 to B6.

In order for the mobile communication device 3-2 to be able to take measurements on the beams B1 to B6 belonging to the macro base station 5-1, the pico base station 5-2 includes the following configuration parameters in its message sent at S603:

for CRS-based Transmission Modes (TM): Cell ID, CRS ports, System bandwidth, and optionally, a Rel-8 codebook (although it does not need to be included);

for DMRS-based Transmission Modes (TM): Cell ID, CRS ports, CSI-RS configuration, system bandwidth, and which codebook is used needs to be signalled as well in addition, subframe level synchronization is assumed (e.g. within CP length) between the macro and pico cells 7-1, 7-2; and ratio of PDSCH EPRE to CSI-RS EPRE (Pc), and the ratio of the PDSCH EPRE to the cell-specific RS EPRE (optional).

In step S604, the mobile communication device 3-2 (using its signal measurement module 47) performs the requested signal quality measurements as specified by the received control data, then it proceeds to generate (using its reporting module 49) and send, in step S605, an appropriately formatted signalling message (e.g. a 'measurement report' RRC message) including the results of the measurement.

For example, the mobile communication device 3-2 may be configured to report for the interfering cell 7-1, one or more of the following:

the 'strongest' PMI (i.e. the PMI corresponding to the pre-coding that produces the strongest RSRP (i.e. interference) at the mobile communication device 3-2);

a list of the number 'N' ('N' being an integer) strongest PMIs, where N is a configurable parameter (e.g. by the serving base station 5-2); and a list of PMIs for which the RSRP at the mobile communication device 3-2 is above (or below) an associated predetermined (configurable) threshold.

Using the results of the measurement provided by the mobile communication device 3-2, in step S607, the pico base station 5-2 identifies (using its interference detection module 63) which beam B1 to B6, if any, causes interference to communications in the pico cell 7-2 (at least for the mobile communication device 3-2 that provided the measurement results).

Next, the pico base station 5-2 generates (using its AAS control module 69) and sends, in step S609, an appropriately formatted signalling message (such as a suitable X2 message) notifying its neighbouring macro base station 5-1 about the beams of that base station 5-1 that have been determined to cause interference to the pico cell 7-2 and/or the beams of that base station 5-1 that are safe to use for transmissions during ABS subframes (i.e. beams that have been determined not to cause interference).

In this example, the pico base station's 5-2 message at S609 comprises an appropriately formatted 'X2 Load Information' message, which includes an 'ABS INFORMATION' information element (IE) as specified in Section 9.1.2.1 of the 3GPP technical specification (TS) 36.423 v12.3.0. However, as illustrated in Table 1 below, this message also includes one or more appropriately formatted IE (e.g. an 'AAS-Specific Information' IE) comprising information (e.g. interfering beam information) derived from the signal quality measurements performed by the mobile communication device 3-2 with respect to beams B1 to B6 of the macro base station 5-1.

TABLE 1

AAS-Specific Information IE

| IE/Group Name | Presence | Range | IE type and reference | Semantics description |
|---|---|---|---|---|
| Interfering Beam Information | O | 1 to <max_No_Of_Beams> | | |
| >Beam direction | M | | | Either Absolute OR Relational. |
| >Azimuth of UE Specific beam | M | — | — | — |
| >Transmit power of UE Specific beam | M | | | |
| >UE Location | O | | | Use DoA/AoA if it is used in weighting factor determination OR Any Absolute Location Information (e.g., GPS) |
| >PMI | O | | | If used in weighting factor calculation |

Therefore, the received interference information identifies any interfering beam (e.g. by its associated PMI) or set of interfering beams (PMIs) that has been determined to cause an interference (and/or any beam(s) determined not to cause an interference) to communications by the mobile communication device 3-2 in the pico cell 7-2.

It will be appreciated that the macro base station 5-1 may receive such information from more than one pico cell in (or immediately adjacent) its coverage area. The macro base station 5-1 is thus able to infer which beams B1 to B6 it is safe to use during eICIC ABS subframes, and which beams B1 to B6 to mute (as generally shown in step S610) during eICIC ABS subframes. It will also be appreciated that in the absence of such information, the macro base station 5-2 may assume that no beams are safe to use, and hence mute all beams B1 to B6 during eICIC ABS subframes.

Operation—Second Embodiment

Figure 7:
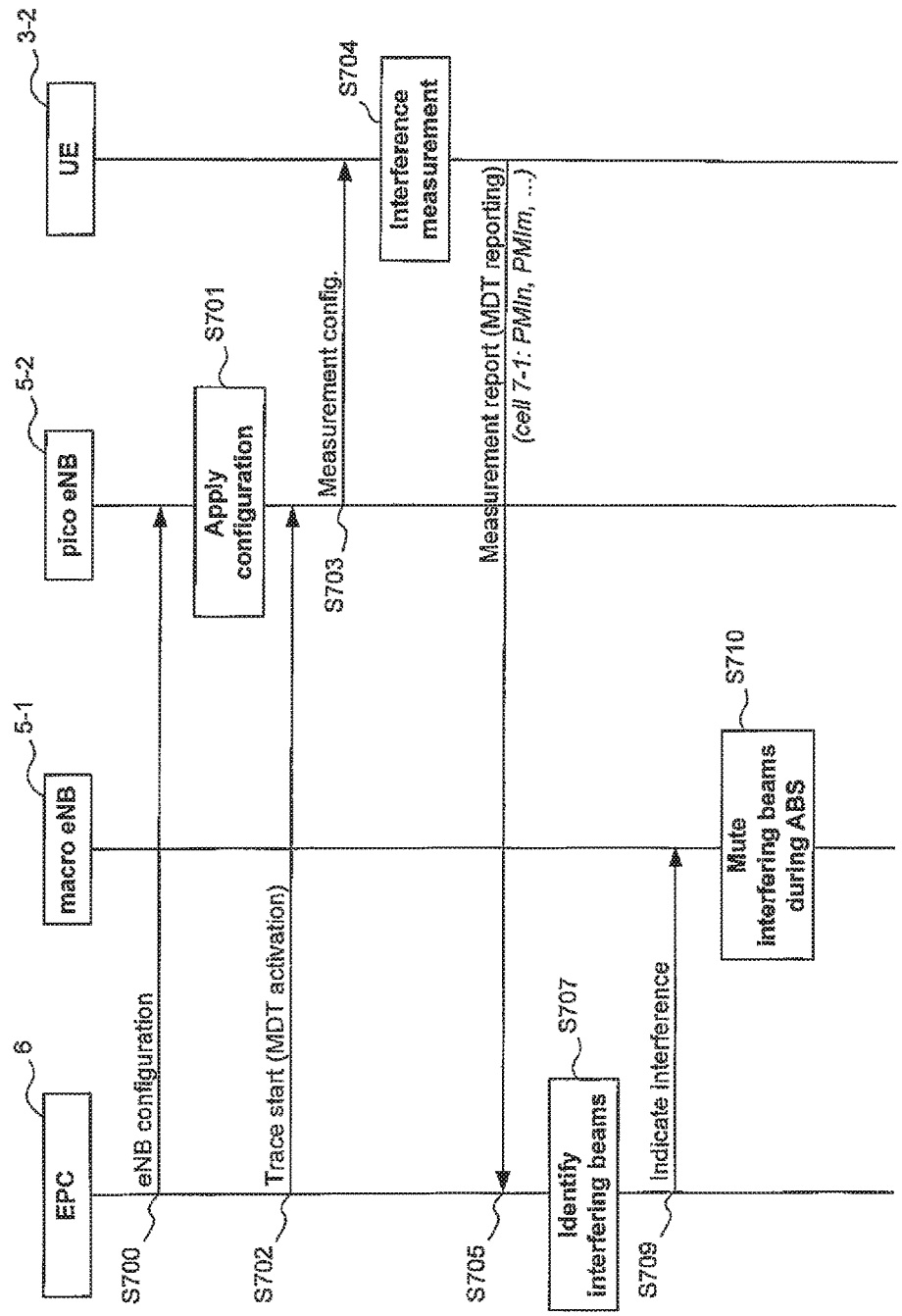
FIG. 7 is an exemplary timing diagram illustrating an exemplary procedure followed by nodes of the telecommunication system of FIG. 1 according to a second exemplary embodiment of the invention.

FIG. 7 is an exemplary timing diagram illustrating a procedure followed by nodes of the telecommunication system 1 of FIG. 1 according to a second exemplary embodiment of the invention. In this case, the mobile communication is configured for the measurement of beam specific interference using a MDT procedure.

In this example, step S700 corresponds to step S600 described with reference to FIG. 6. However, in this case the macro base station 5-1 provides its configuration information via the core network 6, rather than directly. It will be appreciated that this information may be provided directly in this exemplary embodiment as well. In step S701, the pico base station 5-2 stores (in memory 59) the received 'macro-specific' configuration data.

As generally shown in step S702, the MDT server 10 (using its trace module 85 as the EM) generates and sends an appropriately formatted message (e.g. an 'MDT activation' message) to the pico base station 5-2, starting a trace procedure involving the mobile communication device 3-2.

Next, using the macro-specific configuration data, the pico base station 5-2 generates (using its interference detection module 63), and sends, in step S703, an appropriately formatted signalling message (such as an appropriate RRC 'measurement configuration' message) to configure the mobile communication device 3-2 for detecting beams that are interfering with communications for the mobile communication device 3-2 in the pico cell 7-2. In this example, the signalling message at step S603 includes control data for configuring one or more trace measurement by the mobile communication device 3-2 with respect to transmissions using one or more of the beams B1 to B6 operated by the macro base station 5-1. The trace control data by the pico base station 5-2 requests the mobile communication device 3-2 to take measurements pertaining to beams B1 to B6 from the macro base station 5-1 in terms of one or more of: orientation; PMI; azimuth angle; DoA; AoA; and location of the received signal over beams B1 to B6.

In step S704, the mobile communication device 3-2 (using its signal measurement module 47) performs the requested trace measurements as specified by the received trace control data, then it proceeds to generate (using its reporting module 49) and send, in step S705, an appropriately formatted signalling message (e.g. a 'measurement report' MDT message) including the results of the measurement.

For example, the mobile communication device 3-2 may be configured to report to the network node implementing the TCE functionality, one or more of the following information relating to the interfering cell 7-1:

the 'strongest' PMI (i.e. the PMI corresponding to the pre-coding that produces the strongest RSRP (i.e. interference) at the mobile communication device 3-2);

a list of the number 'N' ('N' being an integer) strongest PMIs, where N is a configurable parameter (e.g. by the serving base station 5-2); and a list of PMIs for which the RSRP at the mobile communication device 3-2 is above (or below) an associated predetermined (configurable) threshold.

Using the results of the measurement provided by the mobile communication device 3-2, in step S707, the core network 6 (e.g. the MDT server 10 and/or the OAM entity 11 implementing the TCE functionality) identifies which beam B1 to B6, if any, causes interference to communications in the pico cell 7-2 (at least for the mobile communication device 3-2 that provided the measurement results).

Next, the core network 6 generates and sends, in step S709, an appropriately formatted signalling message (such as a suitable OAM message) notifying the macro base station 5-1 about the beams of that base station 5-1 that have been determined to cause interference to the pico cell 7-2 and/or the beams of that base station 5-1 that are safe to use for transmissions during ABS subframes (i.e. beams that have been determined not to cause interference). Therefore, the received interference information identifies any interfering beam (e.g. by its associated PMI) or set of interfering beams (PMIs) that has been determined to cause an interference (and/or any beam(s) determined not to cause an interference) to communications by the mobile communication device 3-2 in the pico cell 7-2.

Finally, as generally shown in step S710, the macro base station 5-1 infers, from the massage received at S709, which beams B1 to B6 are safe to use during eICIC ABS subframes, and which beams B1 to B6 need to be muted during eICIC ABS subframes.

Operation—Third Embodiment

Figure 8:
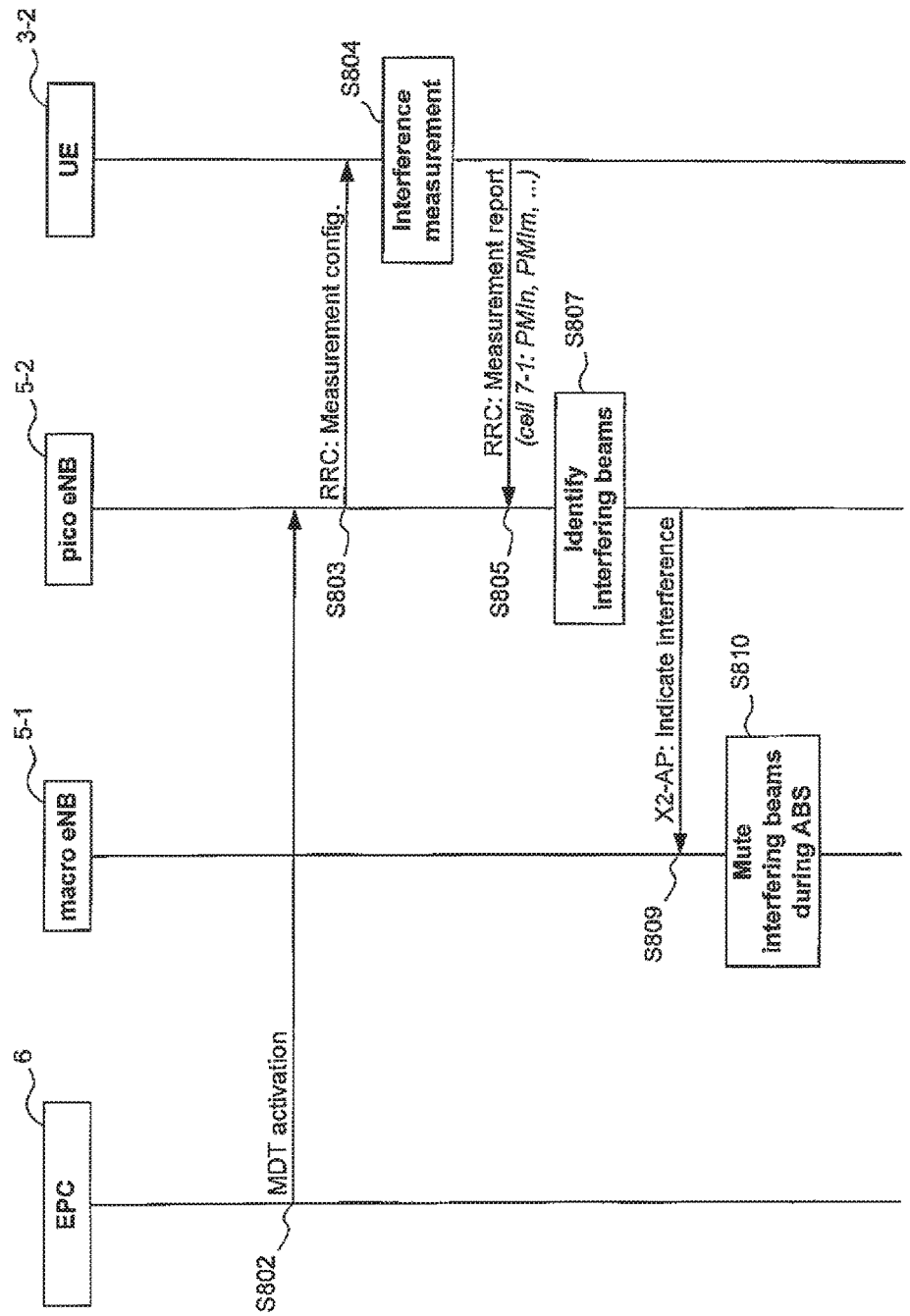
FIG. 8 is an exemplary timing diagram illustrating an exemplary procedure followed by nodes of the telecommunication system of FIG. 1 according to a third exemplary embodiment of the invention.

FIG. 8 is an exemplary timing diagram illustrating a third exemplary embodiment which is a variation of the second exemplary embodiment shown in FIG. 7.

In the above exemplary embodiments, the mobile communication device is described to perform (in step S604/S704/S804) the requested signal quality measurements (as specified by the received control data) and report the results of the measurements to the network. Using the results of the measurement provided by the mobile communication device, the node receiving the measurement report (e.g. the pico base station and/or the OAM entity) is described to determine (in step S607/S707/S807) which beam of the macro cell causes interference to the pico cell. However, it will be appreciated that such determination may also be made by the mobile communication device itself, e.g. prior to generating and/or sending the measurement report. In this case, the measurement report may be sent in dependence on the determination made by the mobile communication device (e.g. the mobile communication device may be configured to report the measurement results only if it determines that there is interference or if it determines that there is no interference during ABS subframes).

As generally shown in step S802, the MDT server 10 (using its trace module 85 as the EM) generates and sends an appropriately formatted signalling message (e.g. an 'MDT activation' message) to the pico base station 5-2. However, rather than starting a trace procedure involving the mobile communication device 3-2 as in FIG. 7, in this case the pico base station 5-2 is requested to configure the mobile communication device 3-2 for performing appropriate signal quality measurements (e.g. CQI measurements) with respect to one or more of the beams B1 to B6 operated by the macro base station 5-1.

Steps S803 to S810 generally correspond to steps S603 to S610 described above with reference to FIG. 6, hence their description is omitted here for simplicity.

<Modifications and Alternatives>

Detailed exemplary embodiments have been described above. As those skilled in the art will appreciate, a number of modifications and alternatives can be made to the above exemplary embodiments whilst still benefiting from the inventions embodied therein. By way of illustration only a number of these alternatives and modifications will now be described.

In the above exemplary embodiments, the base stations are described to exchange information related to interfering beams as part of an existing procedure for exchanging cell load information between the base stations. However, it will also be appreciated that any other suitable procedure, such as an X2 and/or an OAM RRM configuration procedure may be used to exchange information related to interfering beams.

Figure 9:
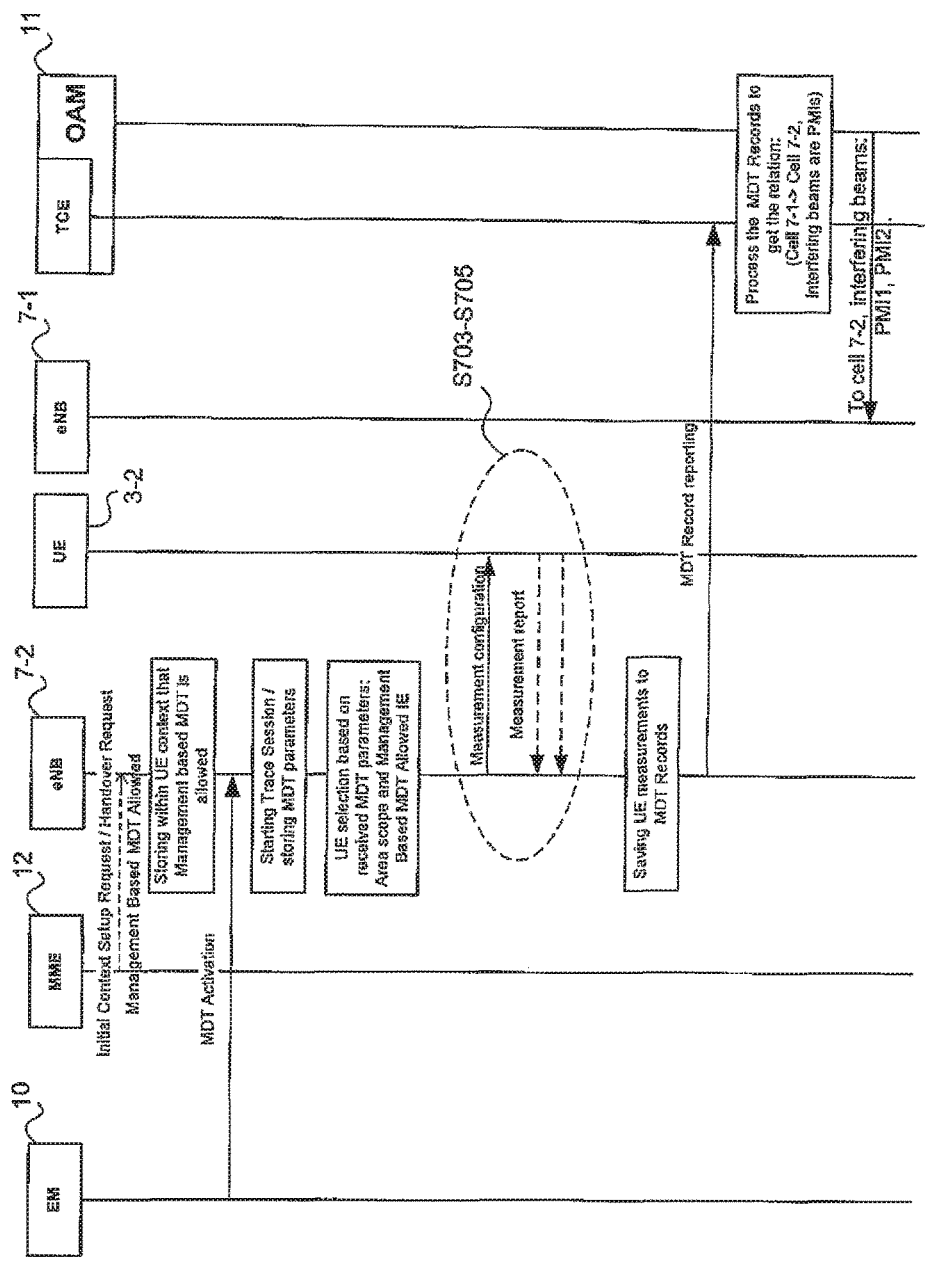
FIG. 9 illustrates further details of the exemplary minimization of drive tests (MDT) procedure shown in FIG. 7.
Figure 10:
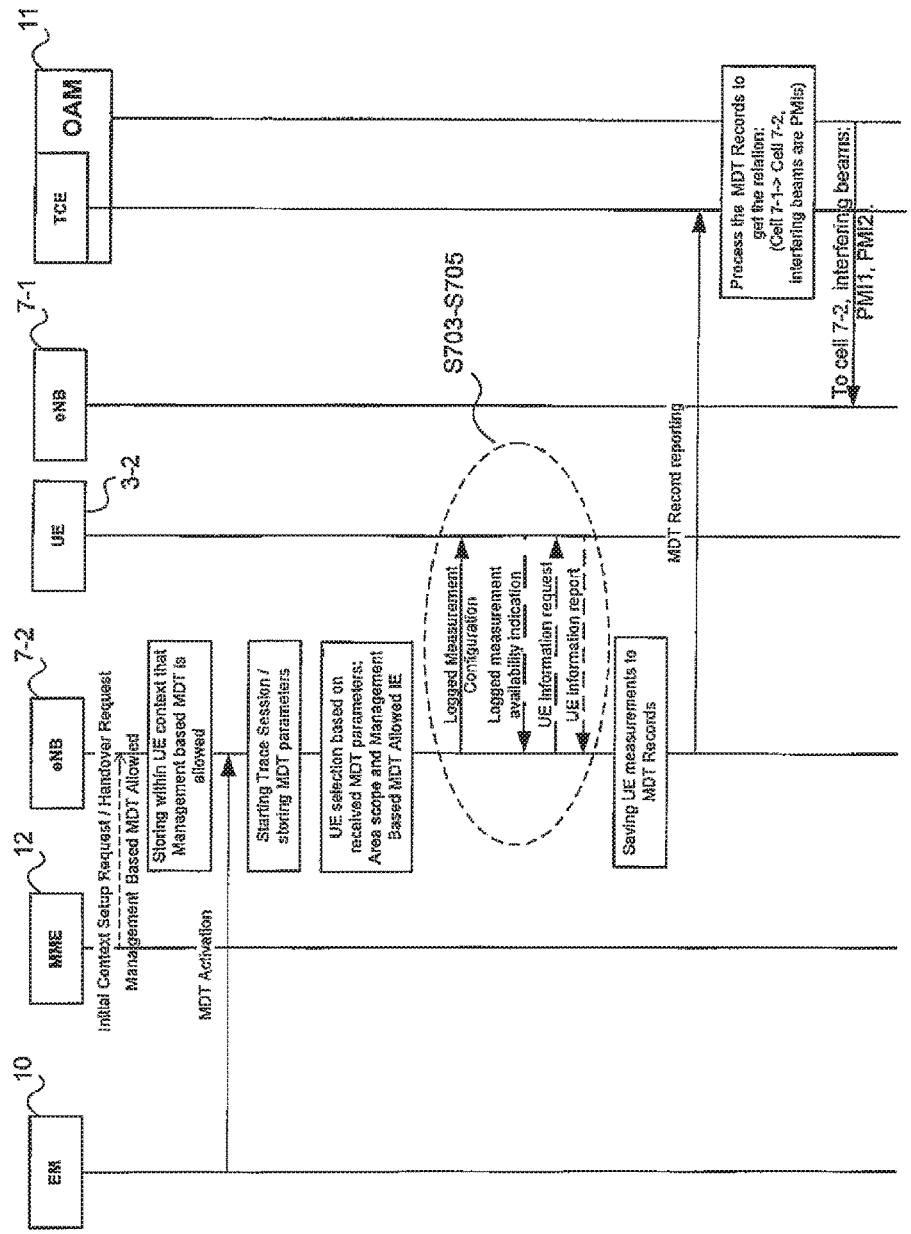
FIG. 10 illustrates further details of the exemplary minimization of drive tests (MDT) procedure shown in FIG. 7.

In the above description of the second exemplary embodiment, the EM functionality is described to configure an appropriate trace functionality for the mobile communication device by sending a trace start message to the pico base station serving the mobile communication device. It will be appreciated that the reporting of the results of the trace measurements may comprise immediate MDT reporting (as generally shown in FIG. 9) and/or logged MDT reporting (as generally shown in FIG. 10). In the case of immediate MDT reporting, the mobile communication device is configured to send the results of the measurements as soon as they are available, whereas in the case of logged MDT reporting, the mobile communication device is configured to send the results of the measurements only upon request by the serving base station (although the mobile communication device may send an appropriate indication to the serving base station that the results of the measurements are available).

In the above exemplary embodiments, the mobile communication device is described to send interference information to the serving pico base station or to the MDT server. However, it will be appreciated that such interference information may be sent to another suitable network entity, such as the OAM entity and/or the MME. The interference information may also be sent to the macro base station itself (e.g. when the mobile communication device is served by both the macro and the pico base station).

It will be appreciated that the entity (or entities) managing the beam interference table may be configured to collect interference reports from a plurality of mobile communication devices, thereby allowing the entity to infer from the collected report more accurately which macro cell beam is (and which beam is not) associated with the inter-cell interference.

It will be appreciated that the interfering-beam table may be implemented, for example, in a similar manner to (and/or as part of) a neighbour relation table (NRT) held at the base station. In this case, the pico and macro base stations may be configured to update their respective NRT (e.g. in step S607 and S610, respectively) based on measurements results obtained from the mobile communication devices. The contents of an exemplary interfering-beam table are illustrated in Table 2 below.

TABLE 2

Interfering-beam table

Cell 7-2 (pico cell)

| NR | TCI | interfering PMI(s) to neighbour | inferfering PMI(s) from neighbour |
|---|---|---|---|
| 1 | TCI#1 (cell 7-2) | | PMI#1, PMI#2 |
| 2 | TCI#2 | | |
| 3 | TCI#3 | | |

Cell 7-1 (macro cell)

| NR | TCI | interfering PMI(s) to neighbour | inferfering PMI(s) from neighbour |
|---|---|---|---|
| 1 | TCI#1 (cell 7-1) | PMI#1, PMI#2 | |
| 2 | TCI#2 | | |
| 3 | TCI#3 | | |

It will be appreciated that the macro base station is not restricted to using beams from the same PMI codebook that is used for the measurements by the mobile communication device. Even if the macro base station uses beams which are not in the PMI codebook, it is still possible to use the PMI information to infer which beams are likely to cause interference.

In the above description, a PMI-based interference measurement is configured for and performed by the mobile communication device (e.g. as illustrated in FIGS. 6 to 8). However, it will be appreciated that such measurements may have other applications outside of controlling transmissions during eICIC ABS subframes. Furthermore, in such other applications it is possible that the interfering cell to be measured is another pico cell rather than the macro cell. Accordingly, the above exemplary embodiments are not restricted to measuring interference caused by a macro cell (i.e. beams thereof).

In the above exemplary embodiments an LTE system is described, in which the macro base station is typically formed by an LTE base station (i.e. eNB). The base stations may operate autonomously in a de-centralised manner taking decisions about their respective localities without communicating with a higher network entity. The base stations may also co-operate with each other by exchanging information over their "X2" interface and taking decisions based on information received from neighbouring base stations (received either directly or via another node).

In the example mobile telecommunication system of FIG. 1, the geographical coverage of the pico cell 7-2 falls completely within the geographical coverage of the macro cell 7-1. However, other arrangements are also possible. For example, some pico cells might overlap partially with the geographical coverage of the macro cell 7, while other pico cells 7 might be completely outside the area of the macro cell 7. In some cases, the same base station 5 might operate any number of macro and pico cells simultaneously. In yet another embodiment, the macro cell 7-1 and pico cell 7-2 form part of two separate telecommunication networks.

The mobile communication device may comprise means for determining whether said result of said signal measurements exceeds an associated threshold, and the means for transmitting may be configured to transmit said measurement report when said determining means determines that said result of said signal measurements exceeds an associated threshold.

The information identifying said beamformed region may comprise a precoding matrix indicator (PMI). The result of said signal measurements may comprise at least one parameter, associated with said beamformed region, comprising: a channel quality indicator, CQI; a reference signal received power, RSRP; an orientation; an azimuth angle; a direction of arrival; an angle of arrival; and a location.

The result of said signal measurements may comprise information identifying whether or not said at least one beamformed region causes interference to said mobile communication device.

The performing means may be operable to perform said signal measurements during an almost blank subframe (ABS) transmitted by said second base station, and the transmitting means may be operable to transmit, to said first base station of said plurality of base stations, a measurement report comprising a result of said signal measurements made during said ABS in association with information identifying a beamformed region in which a signal to which said result of said signal measurements relates was transmitted.

The transmitting means may be operable to transmit said measurement report to a remote server (via said first base station of said plurality of base stations). The measurement report may comprise at least one of: a radio resource control (RRC) signalling message; and a minimization of drive tests (MDT) signalling message.

The mobile communication device may comprise a mobile (cellular) telephone.

The sending means of the serving base station may be operable to send, to said mobile communication device, control data for configuring signal measurements with respect to signals transmitted by said neighbour base station during an almost blank subframe (ABS), and said measurement report may comprise a result of said signal measurements made during said ABS. The sending means may be operable to send, to said mobile communication device, said control data for configuring signal measurements with respect to said signals transmitted by said neighbour base station upon request by another entity (such as an OAM entity and/or an MDT entity).

The serving base station may further comprise means for determining, based on said result of said signal measurements, whether or not a signal strength associated with said beamformed region exceeds an associated threshold, and the serving base station may be operable to generate and transmit, towards said neighbour base station, a signalling message including information identifying whether or not said signal strength associated with said beamformed region exceeds said associated threshold. The associated threshold may comprise a threshold for a maximum interference allowed between cells of said serving base station and said neighbour base station.

The serving base station may comprise a pico or a small cell base station.

The (neighbour) base station may further comprises: means for determining whether or not a respective signal strength associated with said at least one of said plurality of beamformed regions exceeds an associated threshold; and means for controlling signal transmissions in said plurality of beamformed regions in dependence on a determination made by said determining means.

The means for controlling signal transmissions may be operable to: reduce or mute a transmit power at which signals are transmitted in a particular beamformed region when it is determined by said determining means that a respective signal strength associated with that particular beamformed region exceeds an associated threshold; and leave said transmit power at which signals are transmitted in a particular beamformed region unchanged when it is determined by said determining means that a respective signal strength associated with that particular beamformed region does not exceed said associated threshold.

The means for controlling signal transmissions may be operable to control said signal transmissions in said plurality of beamformed regions at least for the duration of an almost blank subframe (ABS).

The obtaining means of the (neighbour) base station may be operable to obtain said information identifying at least one of said plurality of beamformed regions; and said information identifying said respective signal strength associated with said at least one of said plurality of beamformed regions from one of said plurality of base stations via another communication node.

The server apparatus may be configured to operate as an element manager (EM) and/or a trace collection entity (TCE) of a minimization of drive tests (MDT) apparatus. The server apparatus may comprise a minimization of drive tests (MDT) server and/or an operation and maintenance (OAM) entity.

The server apparatus may further comprise means for determining, based on said result of said trace measurements, whether or not a signal strength associated with said beamformed region exceeds an associated threshold, and the server apparatus may be operable to generate and transmit, towards said neighbour base station, a signalling message including information identifying whether or not said signal strength associated with said beamformed region exceeds said associated threshold.

In the above exemplary embodiments, a mobile telephone based telecommunications system was described. As those skilled in the art will appreciate, the signaling techniques described in the present application can be employed in other communications system. Other communications nodes or devices may include user devices such as, for example, personal digital assistants, laptop computers, booklet computers, wireless routers, web browsers, etc. As those skilled in the art will appreciate, it is not essential that the above described system be used for mobile communications devices. The system can be used to improve a network having one or more fixed communication devices as well as or instead of the mobile communicating devices.

In the above exemplary embodiments, a number of software modules were described. As those skilled in the art will appreciate, the software modules may be provided in compiled or un-compiled form and may be supplied to the node as a signal over a computer network, or on a recording medium. Further, the functionality performed by part or all of this software may be performed using one or more dedicated hardware circuits. However, the use of software modules is preferred as it facilitates the updating of the node in order to update its functionality. Similarly, although the above embodiments employed transceiver circuitry, at least some of the functionality of the transceiver circuitry can be performed by software.

Various other modifications will be apparent to those skilled in the art and will not be described in further detail here.

The following is a detailed description of the way in which the present inventions may be implemented in the currently proposed 3GPP standards. Whilst various features are described as being essential or necessary, this may only be the case for the proposed 3GPP standard, for example due to other requirements imposed by the standard. These statements should not, therefore, be construed as limiting the present invention in any way.

1 Introduction

One of the tenets behind HetNet deployment is to employ co-channel as a way to conserve expensive and scarce radio spectrum. With the AAS-based HetNet, capacity improvement is possible with additional coordination among cells. With this extra information, chances for static and stringent way of respecting ABS pattern by both a macro and small cells can be minimised.

The intention is to explore the possibility of enhancing the capacity in AAS-based HetNet deployments. With its argument, it then proposes that this scenario is valid and can be considered as part of this WI.

Figure 11:
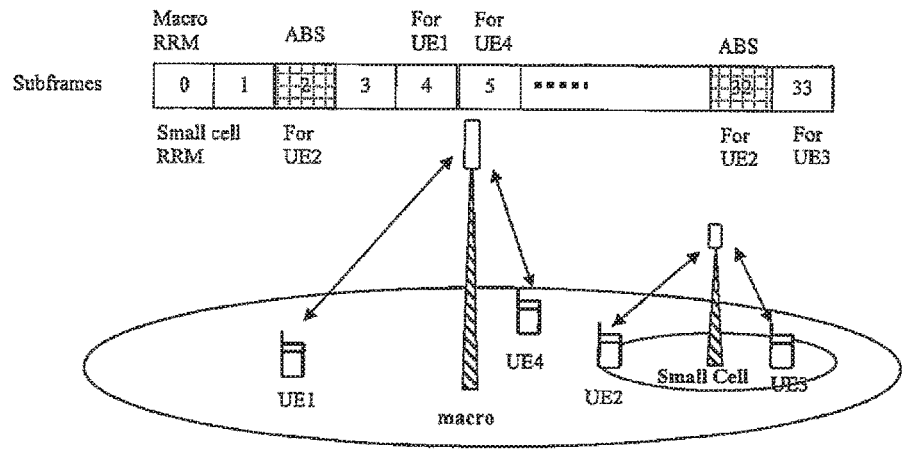
FIG. 11 illustrates a way in which the present invention may be implemented in a 3GPP system.
Figure 12:
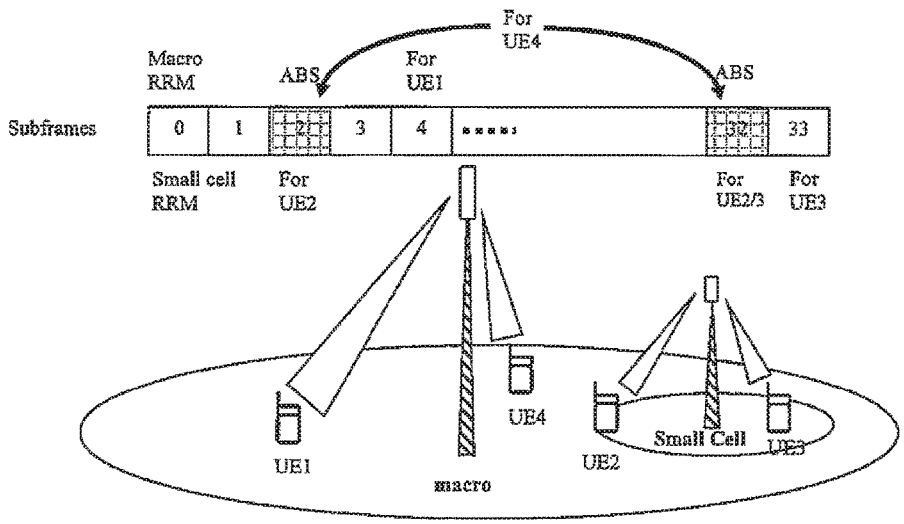
FIG. 12 illustrates a way in which the present invention may be implemented in a 3GPP system.

2 Discussion 2.1 Consideration of HetNet:

FIG. 11: Constant cell coverage and conventional Strict ABS Blinding Future network deployment is going to be of HetNet type. HetNet is different from macro-only deployment in that it contains both small and macro cells predominantly operating on co-channel. From FIG. 11 it can be seen that coverage of macro and small cells remain relatively constant from the perspective of data and control channel perspectives if conventional passive antenna system is used both in macro and small cells. This means UE4 and UE2 that are sufficiently located far apart cannot be scheduled by a macro and a small cell respectively on the same sub-frame. However, this is not true if either macro or small cell or both employs active antennas as shown in FIG. 12. This is because the coverage of each cell at least from the perspectives of L1 data channel varies depending on the locations of active UEs. This means that UE4 and UE2 (and even UE3) that are located fairly close to each other can be scheduled by a macro and a small cell respectively on the same ABS sub-frame if AAS is employed by both provided it can be ensured that interference can be low.

Observation 1: it is possible to relax ABS way muting by the macro if active antenna systems are deployed in HetNet as a way to increase system throughput.

FIG. 12: Time Varying cell coverage and Non-Strict ABS Blinding

As it can be seen on FIG. 12 if both a macro and a given small cell can figure out that UEs (e.g., UE4) currently being served by a macro are far from those UEs being located in Range Extended (RE) area (e.g., UE2), both macro and small cell can use the same ABS sub-frame. This means that a macro does not have to mute its transmission through ABS. However, if UE4 and UE2 are located too close that a macro cannot get away from muting—this means they cannot use the same sub-frame to schedule UEs that are located close to each other in RE. In other words, with extra information exchanged between a macro and a small cell in a timely manner, there is a possibility for each of them not to respect ABS pattern especially if it were configured in a semi-static manner. Greater capacity improvement is possible in both cell-specific beaming and UE-specific beaming situation.

Proposal 1: Given that Network-wide System capacity Increase is possible in the case of AAS-based HetNet, RAN3 is required to explore the possibility of how it can be achieved by giving it a due consideration.

3 Conclusion and Proposals

This paper highlighted that there is a chance to improve System capacity by conserving Scarce Spectrum in AAS-based HetNet deployments by enhancing SON. Based on the findings, it makes the following Observation and a proposal.

Observation 1: it is possible to relax ABS way muting by the macro if active antenna systems are deployed in HetNet as a way to increase system throughput.

Proposal 1: Given that Network-wide System capacity Increase is possible in the case of AAS-based HetNet, RAN3 is required to explore the possibility of how it can be achieved by giving it a due consideration.

4 References

[1] R3-130719 "SON for AAS: Scenarios and Solutions", Ericsson, RAN#79bis, April 2013, Chicago, USA.
[2] R1-132304 "Enhanced Fast ABS Adaptation for Rel-12 Small Cell Scenario 1", Nokia Siemens Networks, Nokia, RAN#79bis, May 2013, Fukuoka, Japan.

The invention claimed is:

1. A mobile communication device for a cellular communication system comprising a pico base station and a macro base station wherein the macro base station is operable to transmit signals in any of a plurality of beamformed regions, the mobile communication device comprising:
a transceiver circuit configured to receive, from said pico base station, control data for configuring signal quality measurements with respect to said signals transmitted by said macro base station, the signal quality measurements being for detecting beams that are interfering with communications for the mobile communication device; and
at least one processor configured to perform said signal quality measurements for each beam;
wherein the transceiver circuit is further configured to transmit, to said pico base station, a measurement report comprising a result of said signal quality measurements for each beam in association with interference information identifying a beamformed region in which a signal to which said result of said signal quality measurements relates was transmitted, the interference information identifying any interference beam that has been determined to cause an interference to communications by the mobile communication device,
wherein the control data is received upon request by another entity.

2. The mobile communication device according to claim 1, wherein the at least one processor is further configured to determine whether said result of said signal quality measurements exceeds an associated threshold, and wherein said transceiver circuit is configured to transmit said measurement report when said at least one processor determines that said result of said signal quality measurements exceeds an associated threshold.

3. The mobile communication device according to claim 1, wherein said interference information identifying said beamformed region comprises a precoding matrix indicator, PMI.

4. The mobile communication device according to claim 1, wherein said result of said signal quality measurements comprises at least one parameter, associated with said beamformed region, comprising: a channel quality indicator, CQI; a reference signal received power, RSRP; an orientation; an azimuth angle; a direction of arrival; an angle of arrival; and a location.

5. The mobile communication device according to claim 1, wherein said result of said signal quality measurements comprises information identifying whether or not said beamformed region causes interference to said mobile communication device.

6. The mobile communication device according to claim 1, wherein said at least one processor is operable to perform said signal quality measurements during an almost blank subframe, ABS, transmitted by said macro base station, and wherein said transceiver circuit is operable to transmit, to said pico base station, a measurement report comprising a result of said signal quality measurements made during said ABS in association with information identifying a beamformed region in which a signal to which said result of said signal quality measurements relates was transmitted.

7. The mobile communication device according to claim 1, wherein said transceiver circuit is operable to transmit said measurement report to a remote server (via said pico base station).

8. The mobile communication device according to claim 1, wherein said measurement report comprises at least one of: a radio resource control, RRC, signalling message; and a minimization of drive tests, MDT, signalling message.

9. The mobile communication device according to claim 1, comprising a mobile (cellular) telephone.

10. A pico base station for a cellular communication system comprising a mobile communication device, said pico base station, and a macro base station, wherein the macro base station is operable to transmit signals in any of a plurality of beamformed regions, the pico base station comprising:
a transceiver circuit configured to send, to said mobile communication device, control data for configuring signal quality measurements with respect to said signals transmitted by said macro base station, the signal quality measurements being for detecting beams that are interfering with communications for the mobile communication device; and
at least one processor configured to obtain, from said mobile communication device, a measurement report comprising a result of said signal quality measurements for each beam in association with interference information identifying a beamformed region in which a signal to which said result of said signal quality measurements relates was transmitted, the interference information identifying any interference beam that has been determined to cause an interference to communications by the mobile communication device,
wherein said transceiver circuit is further configured to send, to said mobile communication device, said control data for configuring quality measurements with respect to said signals transmitted by said macro base station upon request by another entity.

11. The pico base station according to claim 10, wherein said transceiver circuit is further configured to send, to said mobile communication device, control data for configuring signal quality measurements with respect to signals transmitted by said macro base station during an almost blank subframe, ABS; and wherein said measurement report comprises a result of said signal quality measurements made during said ABS.

12. The pico base station according to claim 10, wherein the at least one processor is further configured to determine, based on said result of said signal quality measurements, whether or not a signal strength associated with said beamformed region exceeds an associated threshold, and wherein said pico base station is operable to generate and transmit, towards said macro base station, a signalling message including information identifying whether or not said signal strength associated with said beamformed region exceeds said associated threshold.

13. The pico base station according to claim 12, wherein said associated threshold comprises a threshold for a maximum interference allowed between cells of said pico base station and said macro base station.

14. A method performed by a mobile communication device in a cellular communication system comprising a pico base station and a macro base station wherein the macro base station is operable to transmit signals in any of a plurality of beamformed regions, the method comprising:
  receiving, from said pico base station, control data for configuring signal quality measurements with respect to said signals transmitted by said macro base station, the signal quality measurements being for detecting beams that are interfering with communications for the mobile communication device;
  performing said signal quality measurements for each beam; and
  transmitting, to said pico base station, a measurement report comprising a result of said signal quality measurements in association with interference information identifying a beamformed region in which a signal to which said result of said signal quality measurements relates was transmitted, the interference information identifying any interference beam that has been determined to cause an interference to communications by the mobile communication device,
  wherein the control data is received upon request by another entity.

15. A method performed by a pico base station in a cellular communication system comprising a mobile communication device, said pico base station, and a macro base station, wherein the macro base station is operable to transmit signals in any of a plurality of beamformed regions, the method comprising:
  sending, to said mobile communication device, control data for configuring signal quality measurements with respect to said signals transmitted by said macro base station, the signal quality measurements being for detecting beams that are interfering with communications for the mobile communication device; and
  obtaining, from said mobile communication device, a measurement report comprising a result of said signal quality measurements for each beam in association with interference information identifying a beamformed region in which a signal to which said result of said signal quality measurements relates was transmitted, the interference information identifying any interference beam that has been determined to cause an interference to communications by the mobile communication device,
  wherein the control data is sent upon request by another entity.

* * * * *

UNITED STATES PATENT AND TRADEMARK OFFICE
CERTIFICATE OF CORRECTION

| | |
|---|---|
| PATENT NO. | : 10,506,464 B2 |
| APPLICATION NO. | : 15/524105 |
| DATED | : December 10, 2019 |
| INVENTOR(S) | : Yuhua Chen and Sivapathalingham Sivavakeesar |

It is certified that error appears in the above-identified patent and that said Letters Patent is hereby corrected as shown below:

In the Specification

Column 22, Line 58: Delete "situation." and insert --situations.-- therefor

In the Claims

Column 24, Line 50: Claim 10, after "configuring", insert --signal--

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*